US007353296B2

(12) United States Patent
Nuuttila

(10) Patent No.: US 7,353,296 B2
(45) Date of Patent: Apr. 1, 2008

(54) METHOD FOR PERFORMING DATA STRUCTURE CONVERSIONS

(75) Inventor: Petri Nuuttila, Inkoo (FI)

(73) Assignee: Nokia Corporation, Espoo (FI)

( * ) Notice: Subject to any disclaimer, the term of this patent is extended or adjusted under 35 U.S.C. 154(b) by 1083 days.

(21) Appl. No.: 10/433,977

(22) PCT Filed: Dec. 11, 2001

(86) PCT No.: PCT/FI01/01083

§ 371 (c)(1),
(2), (4) Date: Jun. 10, 2003

(87) PCT Pub. No.: WO02/48856

PCT Pub. Date: Jun. 20, 2002

(65) Prior Publication Data

US 2005/0114355 A1 May 26, 2005

(30) Foreign Application Priority Data

Dec. 12, 2000 (FI) .................................. 20002720

(51) Int. Cl.
*G06F 15/16* (2006.01)
(52) U.S. Cl. ..................... 709/246; 707/100
(58) Field of Classification Search ................ 709/246; 707/100
See application file for complete search history.

(56) References Cited

U.S. PATENT DOCUMENTS 6,021,259 A    2/2000  Bahrs et al.
6,041,344 A    3/2000  Bodamer et al.
6,400,287 B1*  6/2002  Ehrman ........................ 341/55
6,463,445 B1* 10/2002  Suzuki et al. ................ 707/200

(Continued)

FOREIGN PATENT DOCUMENTS

EP       0 624 964 A1    11/1994

(Continued)

OTHER PUBLICATIONS

Project P508, "Evolution, Migration Paths and Interworking to TINA", Apr. 1997, vol. 8 of 8: COBRA as an Enabling Factor for Migration from IN to TINA:A EURESCOM P508 Perspective.

*Primary Examiner*—Krisna Lim
(74) *Attorney, Agent, or Firm*—Squire, Sanders & Dempsey L.L.P.

(57) ABSTRACT

The invention relates to any conversions in which data of a certain source format are converted into data of a certain target format. The conversions may also be bi-directional. The invention includes a method for performing data structure conversions, wherein a data structure comprises at least two elements located in a predetermined order in the data structure. The data structure is defined by using a definition language, and it is represented as a source bit string. During the conversion the source bit string is converted into a target bit string. The method for performing the data structure conversion handles the data structure elements in the same order as they are located in the data structure without parsing the source bit string. The avoidance of the parsing makes the method more efficient than the prior art methods. In addition, the method decodes each data structure element and encodes it directly into the target bit string. Also the avoidance of unnecessary copying of data makes the method efficient.

42 Claims, 8 Drawing Sheets

U.S. PATENT DOCUMENTS

| | | | |
|---|---|---|---|
| 6,560,772 B1 * | 5/2003 | Slinger | 717/124 |
| 6,606,660 B1 * | 8/2003 | Bowman-Amuah | 709/227 |
| 2003/0179315 A1 * | 9/2003 | Collins et al. | 348/441 |
| 2003/0208473 A1 * | 11/2003 | Lennon | 707/3 |

FOREIGN PATENT DOCUMENTS

| | | |
|---|---|---|
| EP | 0 873 025 A1 | 10/1998 |
| WO | WO 00/56033 | 9/2000 |

* cited by examiner

METHOD FOR PERFORMING DATA STRUCTURE CONVERSIONS

FIELD OF THE INVENTION

The present invention relates to data conversions between INAP/MAP messages and certain other messages. The INAP/MAP messages are used in the SS7 network, and the other messages are used in certain distributed systems.

BACKGROUND OF THE INVENTION

The Object Management Group (OMG) consortium has defined an architecture termed Common Object Request Broker Architecture (CORBA). The CORBA architecture enables the distribution of applications on different kinds of platforms. According to the client-server model, there are two kinds of applications: the client applications that request services and the server applications that offer the requested services.

In CORBA architecture the services and computer units work together so that the services are independent of the operating systems and the hardware platforms. CORBA encapsulates the C++ code and data into objects so that the objects are accessible by means of method invocations. In this way a client can access objects located in another computer unit. The client does not know where the service takes place geographically, but only the name and interface of the objects providing the service.

CORBA 2.0 includes specifications for a functionality that is termed Object Request Broker (ORB). ORB enables transparent communication between applications. The client and the server applications are separated from the mechanism used for communicating, activating, and storing objects. Each computer unit which needs to communicate with other units has the ORB functionality.

Intelligent Network (IN) is an architectural concept for the creation and provision of advanced telecommunications services.

FIG. 1 shows an example of IN architecture based on CORBA. The SS7 network can communicate with the Public Switched Telephone Networks (PSTNs) and the Public Land Mobile Networks (PLMNs). It can also communicate with CORBA through a bridge shown in FIG. 1. Furthermore, the SS7 network can communicate with the Internet via CORBA.

The International Telecommunication Union (ITU) has defined a protocol named the Transaction Capabilities Application Part (TCAP). TCAP describes dialog handling and communication procedures for the transfer of non-circuit-related signals. TCAP is a general protocol that reduces the need for the development of new protocols when new features are introduced in the SS7 network. TCAP belongs to layer 7 of the OSI model and provides a protocol layer for specific applications such as mobile and IN applications.

For example, the Intelligent Network Application Protocol (INAP) is one protocol that TCAP supports. INAP relates to communication between IN physical network elements. INAP is defined by ITU, and the other version of INAP called "Core INAP" is defined by ETSI (European Telecommunication Standards Institute).

Mobile Application Part (MAP) is another protocol that TCAP supports. MAP is used in mobile networks.

INAP and MAP are SS7 network protocols. The commonly known TCP/IP protocol is one of the Internet protocols.

The next three protocols are used in CORBA:

General Inter-ORB Protocol (GIOP) specifies standard transfer syntax and a set of message formats for communications between the ORBs.

Environment-Specific Inter-ORB Protocol (ESIOP) specifies how GIOP messages are exchanged using a particular networking or distributed computing infrastructure.

Internet Inter-ORB Protocol (IIOP) specifies how the GIOP messages are exchanged using TCP/IP connections. IIOP provides interoperation between ORBs on the vendor-neutral transport layer.

Light Directory Access Protocol (LDAP) specifies directory models supporting X.500 directory models, while avoiding certain resource requirements of X.500 Directory Access Protocol (DAP). The X.500 directory models and said DAP are defined by ETSI. LDAP is specifically targeted at Internet management applications and browser applications that provide read access or write access to directories. LDAP assumes there are one or more servers providing access to the tree making up the entries. Each entry has a name formed from letters and numbers representing attribute values so that one or more attribute values at the beginning of the name distributes the entry form to all others. The tree being made up of the entries is termed an LDAP directory.

Besides protocols also abstract languages and special transfer syntaxes are needed. The abstract languages and transfer syntaxes define how the data are to be encoded and located in the messages.

Interface Definition Language (IDL) is an abstract language used in CORBA. IDL specifies objects that compose an interface of a client application.

Common Data Representation (CDR) is a transfer syntax that maps IDL types, i.e. data types, to low-level representation for on-wire-transfer between ORBs.

The SS7 network delivers messages that are specified using data structure language named the Abstract Syntax Notation One (ASN.1). The ASN.1 language is capable of specifying complex recursive data types and is used to describe the content and context of messages. During transfers over the SS7 network, the values of the ASN.1 types are encoded according to a transfer syntax such as Basic Encoding Rules (BER). The BER enables a series of recursive elements, comprised of Tag, Length, and data fields. The Tag fields indicate what type of data is packed into the message, and the Length fields indicate the number of bytes of data within this particular part of the message.

In order to convert data between different networks, certain kinds of mapping rules are also needed. The Telecom Task Force group in OMG has defined the mapping rules between INAP and IDL data definitions. In addition, the X/open Preliminary Specifications include an ASN.1 to IDL translation algorithm. The INAP/MAP messages of the SS7 network are inputs for generating the GIOP messages of CORBA, and vice versa. This message generation is executed according to the mapping rules.

The Service Logic Environment (SLE) is an entity made for executing CORBA services. The SLE is equipped with an ORB functionality, which enables applications to provide services for other applications.

As illustrated in FIG. 2, the SLEs connect the applications to CORBA. An Inter-Working Unit (IWU), shown in FIG. 2, is one part of the bridge, shown in FIG. 1, which connects the CORBA network to the SS7 network. In this context, IWU refers to a process, not necessarily to a computer unit. IWU is equipped with the ORB functionality as well as the SLEs. Therefore, IWU and the SLEs comply with GIOP, ESIOP, and IIOP protocols. IWU communicates with the SLEs via CORBA using GIOP messages.

TCAP is a protocol as described above. In this paper, TCAP also refers to a process. As shown in FIG. 2, TCAP is the other part of the bridge connecting CORBA and the SS7 network. TCAP communicates with the SS7 network using INAP or MAP messages.

The bridge receives GIOP messages from an SLE, and INAP/MAP messages from the SS7 network. Receiving a message can be termed an event. The bridge creates a record of an event, which record includes data received in a message. Inside the bridge, IWU and TCAP may communicate with each other by transmitting records of events.

A dialog refers to communication between two applications using data conversions. A dialog is composed of dialog primitives. The dialog primitives indicate the beginning of a dialog, the formation of a dialog, the continuation of a dialog, and the end of a dialog. The dialog primitives may also transmit data belonging to a dialog.

When a TCAP begin message is received from the SS7 network to the bridge, an association is formed between an application executing in SLE and the SS7 layer in the bridge. This TCAP begin message is termed SS7Begin dialog primitive. Alternatively, the SLE can initiate the association between it and the SS7 layer in the bridge by sending an SLEBegin named dialog primitive. The association represents a dialog which has been established all the way from the SLE application to the application on the SS7 network. Events relating to one association compose a dialog. The application on the SS7 network may be, for example, a call instance process executing in a service switching point (SSP). The dialog could represent, for example, an IN control relationship between the SLE application and the SSP call instance.

During an association, i.e. during a dialog, a CORBA application may execute remote operations for an SS7 application. The Remote Operation Procedure (ROP) defines how the remote operations are invoked and how the results or errors of the invoked remote operations are received. The ITU has defined remote operations for CORBA. These remote operations are called IDL operations.

The ITU has also classified different kinds of INAP operations. The INAP operations define how remote operations of SS7 applications are invoked and how the results or errors of the invoked operations are received.

The Telecom Task Force group in OMG has defined mapping rules between the IDL and the INAP operations. The mapping rules are needed because CORBA applications and SS7 applications should be able to execute remote operations for each other.

In data conversions the data of a first format is converted to the data of a second format. The data of the first format as well as the data of the second format is stored in one or more data structures. A utility is a program or a part of a program which executes data conversion between certain data structures. Utilities compose a set which is termed a utility set. Correspondingly, messages of a certain protocol compose a message set. For example, the messages of the INAP protocol compose an INAP message set.

The utilities perform conversions from one encoding format to another. In this case encoding means, for example, how data structures are represented in the data communication between two entities. The aim is to provide conception of the structure and semantics of the data on the target side which is similar to the source side.

The present invention relates generally to the bridge shown above. Next, the object-oriented programming and compiler techniques utilized within the bridge will be discussed.

JAVA and C++ are examples of object-oriented programming languages. The objects may compose, for example, an interface of a CORBA server application. Each object is defined as a class, which includes some data and methods for handling that data. A class may also include methods for handling the data of other classes.

A compiler is a program that reads one or more input files and writes an executable code, or a source code, in one or more output files. The executable code may act, for example, as a utility set offering conversions between different data definitions. A compiler itself, and the files read and processed by the compiler, may include various classes.

More specifically, the invention concerns converting BER encoded ASN.1 data structures into the CDR data structures, and vice versa. The BER encoded ASN.1 data structures are named briefly as BER data structures and said conversions are named briefly as BER-CDR conversions. The BER-CDR conversions are executed in the IWU shown in FIG. 2.

Each utility can execute the BER-CDR conversion between an IDL-based interface definition and an ASN.1-based interface definition. There could be several versions of both types of interfaces. Thus a utility executes the conversion between a certain version of the interface defined by the IDL and a certain version of the interface defined by the ASN.1.

The interfaces could correspond to, for example, a certain MAP, INAP, or CAP version and their interface which is based on ASN.1 or IDL definitions. For instance, a utility could perform a conversion related to CAP (Camel Application Protocol). It could perform the conversion between the CDR encoding of a data type in the IDL interface and the BER encoding of a data type in the ASN.1 interface for CAP version 3.

There are older and newer versions of INAP/MAP message sets. Each utility can execute the BER-CDR conversion between a data structure of a certain GIOP message version and a data structure of a certain INAP/MAP message version. Thus, a great many utilities for the BER-CDR conversions are needed to enable conversions between each GIOP and INAP/MAP message set versions.

Snacc is an example of a known freeware compiler which can be utilized in the BER-CDR conversions. As any compiler, the Snacc comprises at least the lexical analyzer, grammatical parser, and code generator. The lexical analyzer extracts grammatical tokens from the input stream. In this case, the input stream contains BER encoded ASN.1 data structures.

The Snacc compiler uses its embedded BER library for generating a C++ code. The BER library has the functionality to convert BER data structures into ASN.1 C++ classes, and vice versa.

The Snacc compiler generates the C++ code for BER-CDR conversions. The C++ code includes the following method calls of the BER library:

BEncPdu
BDecPdu
BEnc
BDec
BEncContent
BDecContent

In these method names "Enc" refers to encoding and "Dec" refers to decoding. "Pdu" refers to a Protocol Data Unit; which is a block of data transmitted in the network.

The procedure hierarchy structure of the generated code corresponds to the structure of the ASN.1 data types presented as input to the Snacc compiler. Thus, depending on how the data types have been nested, the encoding routines of different data types call each other. For example, if datatype1 contains datatype2 in its structure, the encoding function of datatype1 calls the encoding function of datatype2.

Every C++ class generated is derived from a base class named AsnType. The code generation is executed one data structure at a time and one field of the data structure at a time.

For example, if the type of the field is integer, a class named AsnInt is used. Thus, the type of the field determines which derived class of the AsnType base class is used in the code generation.

The Orbix library (produced by a company named IONA) is an example of a known tool which can be utilized in the BER-CDR conversions. The Orbix library uses its embedded CDR library for generating C++ code.

The CDR library has a functionality to convert CDR data structures into IDL C++ classes, and vice versa.

FIG. 3A shows how the utilities for the BER-CDR conversions are generated in prior art. The generation of the utilities consists of at least three phases that are marked 1 to 3. The second phase is further divided into three sub-phases 2A, 2B, and 2C.

Thus the Snacc compiler can be used to generate the C++ code for phase 1, in which BER encoded data structures are converted to ASN.1 classes or vice versa. Correspondingly, the Orbix library can be used to generate the C++ code for phase 3, in which IDL C++ classes are converted to CDR encoded data structures or vice versa.

In prior art, there is no tool for phase 2, i.e. the translation phase. Therefore a programmer has to write: a) a program "2A" for translations between the ASN.1 C++ classes and ASN.1 instances, b) a program "2B" for translations between the ASN.1 instances and IDL instances, and c) a program "2C" for translations between the IDL instances and IDL C++ classes.

The following example describes what kind of definition files the NAC compiler reads. The example concerns an "InitialDP" named operation which is defined in "IN Capability Set 1".

The definition for the "InitialDP" operation may be in a file named "operation.asn":

```
CS1OPErationTypes DEFINITIONS ::=
    ...
InitialDP                         ::= OPERATION
            ARGUMENT    InitialDPArg
            ERRORS {
                    ...}
InitialDP                         OPE ::= OBJECT {
            &Arg                  InitialDPArg
            &Err{
                    ...}
```

The definition for an "InitialDPArg", which is printed in the "operation.asn" file, is given in another file that may be named "argument.asn". The definition for the "InitialD-PArg" is given in an "argument.asn" file as:

```
InitialDPArg ::= SEQUENCE {
    serviceKey              [0] ServiceKey,
    ...
    redirectionInformation  [30] RedirectionInformation
    ...}
```

The following two examples concern the conversion of the "InitialDpArg" named data structure which is showed above, and which is BER encoded. We may assume that also the corresponding CDR data structure is named the "InitialDpArg".

The Snacc compiler processes the data structure field by field. This processing depends on the type of field. For example, "InitialDpArg" data structure contains a field which is named a "serviceKey". When the Snacc compiler has read the "serviceKey" field, the Snacc compiler generates C++ code so that the BDecContent method of the AsnInt class is called because the "serviceKey" field is the integer type.

The C++ code processing also depends on whether a field includes a data structure or not, i.e. on whether the processed data structure is nested or not. If the field of the data structure includes a data structure, the data structure included is handled in the same way as the field itself.

EXAMPLE 1

Generating a C++ code which converts BER to CDR (see FIG. 3A).

In phase 1, the BER data structure is the input and ASN.1 C++ classes are the output of the phase. The Snacc compiler generates a C++ code for each field of the InitialDPArg class so that the C++ code includes the following method calls of the BER library in the following order:
   the BDecPdu and BDec method calls of the InitialDp-Arg class,
   the BDecContent method call of the InitialDpArg class, which in turn calls the BDecContent method of the AsnType class.

In sub-phases 2A, 2B, and 2C, the ASN.1 C++ classes are the input and the IDL C++ classes are the output.

In phase 3, the IDL C++ classes are the input and a CDR data structure is the output of the phase. Method calls in the Orbix library are executed for each IDL C++ class.

EXAMPLE 2

Generating C++ code which converts CDR to BER (see FIG. 3A).

In phase 1, the BER data structure is the input and ASN.1 C++ classes are the output of the phase. The Snacc compiler generates a C++ code for each field of the InitialDPArg data structure so that the C++ code includes the following method calls of the BER library in the following order:
   the BEncPdu and BEnc method calls of the InitialDpArg class,
   the BEncContent method call of the InitialDpArg class, which in turn calls the BEncContent method of the AsnType class.

The other phases are same as above.

A C++ code is generated for several output files, and each output file is compiled by a C++ compiler. This compilation results in a program termed "utility". Each utility executes data conversions between certain data structures. In respect to examples 1 and 2, the compilation results in a utility which converts the "InitialDpArg" BER data structure into the "InitialDpArg" CDR data structure and vice versa.

FIG. 3C shows that the BER encoded data is at first instantiated to ASN.1 instances. Then the ASN.1 instances are instantiated to IDL instances, and lastly, the IDL instances are extracted to CDR encoded data. Because of ASN.1 and IDL instances, there is a lot of data copying when executing BER-CDR conversions.

There are several drawbacks relating to the prior art BER-CDR conversions.

The first drawback is a lack of suitable utilities for BER-CDR conversions. Consequently, customers of the SS7 network shown in FIG. 2 are able to use only those applications of CORBA which are supported by utilities for certain message sets. Correspondingly, customers of CORBA (network) are able to use only those applications of the SS7 network which are supported by suitable utilities. The utilities for different message sets, i.e. the utilities for different data formats, are difficult to produce. Therefore, quite a few applications are usable for the customers of different networks.

The second drawback is that the utilities are quite inefficient. The generated C++ code of the utilities includes a lot of data copying from one data structure to another data structure. This copying makes the utilities inefficient and so that the usable applications of the CORBA and SS7 network operate slowly, which irritates the end users of the applications.

The third drawback is that the utilities are poorly manageable. There are many dialogs to be handled simultaneously, and a utility suitable for an event of a current dialog should be found automatically. Therefore, a runtime system of IWU, or some other system, should manage the utilities. In prior art, a lot of designing and programming is needed to create a system that determines which utility is the right one for the current conversion. This is another reason why quite a few applications are usable for the customers of different networks.

SUMMARY OF THE INVENTION

The first objective of the invention is to improve the availability of services for the end users. This concerns the services located in one network and intended for customers of some other network. Then, for example, customers of the SS7 network can use more services offered by CORBA, and customers of CORBA can use more services offered by the SS7 network which have not been available to them up now.

The second objective of the invention is to enable the services offered services to operate faster than nowadays, e.g. CORBA services used from the SS7 network via a bridge.

The third objective of the invention is to maximize the automation of the maintenance of a bridge. Then, for example, the bridge can be adapted for a new message set without programming. Also, automated maintenance of the bridge increases the availability of the services.

The objectives of the invention can be accomplished by using the solutions defined in the patent claims.

The present invention relates to any conversions, in which data of a certain source format is converted into data of a certain target format. For instance, the source format may be BER and the target format CDR. Conversions may also be bi-directional.

In an embodiment of the invention, the coding rules indicating the encoding for data type definitions in the target format, i.e. in the target encoding format, can also be represented as a mapping between data types in different definition languages. The actual target encoding format for the data types defined in the first definition language are then obtained as follows: first mapping the data structure definitions in the first definition language to corresponding definitions in the second definition language and then using the information on the encoding of the data type definitions of second definition language in the target encoding format.

For instance, ASN.1 data type definitions are converted to IDL and then information on the CDR encoding of the IDL data types is used for the target format encoding of the data structure definitions. Thus, there is a mapping from ASN.1 data types to IDL data types. The mapping maps a data type of a first definition language to a data type of a second language.

For instance, ASN.1 data type SEQUENCE is mapped to IDL "struct" data type and SET OF is mapped to IDL "sequence" data type:

```
ASN.1 definition
    NameTree ::= SEQUENCE { rdnInfo RDNINFO,
                            children SET OF NameTree }
is mapped to
    struct NameTreeType { RDNInfoType rdnInfo;
                          sequence <NameTreeType>children; }
```

Alternatively, a data type in the first definition language could be mapped to a set of embedded data type definitions in the second definition language.

For instance, this could mean that an ASN.1 data type termed CHOICE is mapped to a set of definitions comprising: 1) an "enum" definition to define the types of elements that can be present in the structure, 2) a union definition to indicate which of the said elements is actually present in one instance of the data type, and finally 3) the definitions for the elements of CHOICE. This is illustrated below with an example:

```
ASN.1 definition
    Context ::= CHOICE { id INTEGER, data EXTERNAL }
is mapped to
    enum ContextTypeChoice { idChoice, dataChoice };
    union ContextType switch (ContextTypeChoice) {
              case idChoice: ASN1__Integer id;
              case dataChoice: ASN1__External data; };
``` in IDL.

The present invention includes a method for performing data structure conversions, wherein a data structure comprises at least two elements being located in a predetermined order in the data structure. The data structure is defined by using a definition language and it is represented in as a source bit string. During the conversion the source bit string is converted into a target bit string which represents the corresponding data structure. The method for performing data structure conversion comprises the following steps:

browsing the source bit string, identifying in the source bit string each data structure element of the data structure, and handling the data structure elements in the same order as they are located in the data structure without parsing the source bit string; in addition, the handling is executed so that each data structure element is encoded directly into the target bit string, thus avoiding unnecessary copying of data.

The present invention further includes a program, i.e. a utility for executing a certain data structure conversion. Utilities compose a utility set.

The present invention further includes a compiler which creates the utility set. The compiler creates the utility set by using one or more definition files and coding rules. The coding rules provide information about data types and data structures of different format. For instance, the coding rules provide information about how certain ASN.1 data structures are encoded in CDR. The coding rules may concern low level data types such as integers, octet string, sequences, and choices. In the case of a sequence, the mapping rules may indicate how the start of the sequence, the end of the sequence, and the presence of individual elements are encoded in the sequence. The coding rules may be part of the executable code of the compiler. The compiler may also read at least part of the coding rules from a set of files.

In the following it is assumed that the coding rules are stored in two class libraries, which are termed "first class library" and "second class library". The compiler reads at least two class definitions: one from the first class library and one from the second class library. Then the compiler generates a class definition which is termed "wrapper class".

The wrapper class includes at least one method which calls at least one method of the source class and one method of the target class. The compiler writes the classes read, and the wrapper class generated in an output file set. After the output file set is compiled, the utility set for conversions is created.

The compiler generates a second output file for identification records. Each identification record includes a pointer to a utility and an attribute for storing the ID (identifier) of the utility. The identification records are used for identifying the utilities which are created by the compiler according to the present invention.

The identification records generated into the second output file operate as an index through which each utility can be obtained. When the ID of a utility is found in some identification record, the utility is obtained by using the pointer of the identification record.

The compiler further generates a third output file for mapping rules. These mapping rules are used when determining which operations, or which data definitions, are analogous with each other.

The compiler further generates a fourth output file for an initialization file set. A certain initialization process reads the initialization file set and creates a fifth output file for context set records. The context set records are used, for example, to identify a message set of a message.

The present invention further includes a system for using the utility set created by the compiler. The said system may operate as a bridge between two networks, such as CORBA and the SS7 network. The system uses the utility set through a selection mechanism based on the above-mentioned output files of the compiler:
the identification records (in the second output file),
the mapping rules (in the third output file), and
the context set records (in the fifth output file).

The system handles dialogs between applications, and it executes the data conversions needed. By using the selection mechanism, the system obtains pointers to the identification records, from where the system obtains pointers to an appropriate utility intended for a current data conversion.

BRIEF DESCRIPTION OF THE DRAWINGS

The invention is described more closely with reference to the accompanying drawings, in which.

DETAILED DESCRIPTION OF THE INVENTION

A compiler named "NAC" generates the utilities for the BER-CDR conversions. However, the ideas of the invention can also be used in other compilers which generate utilities for data conversions.

Figure 4A:
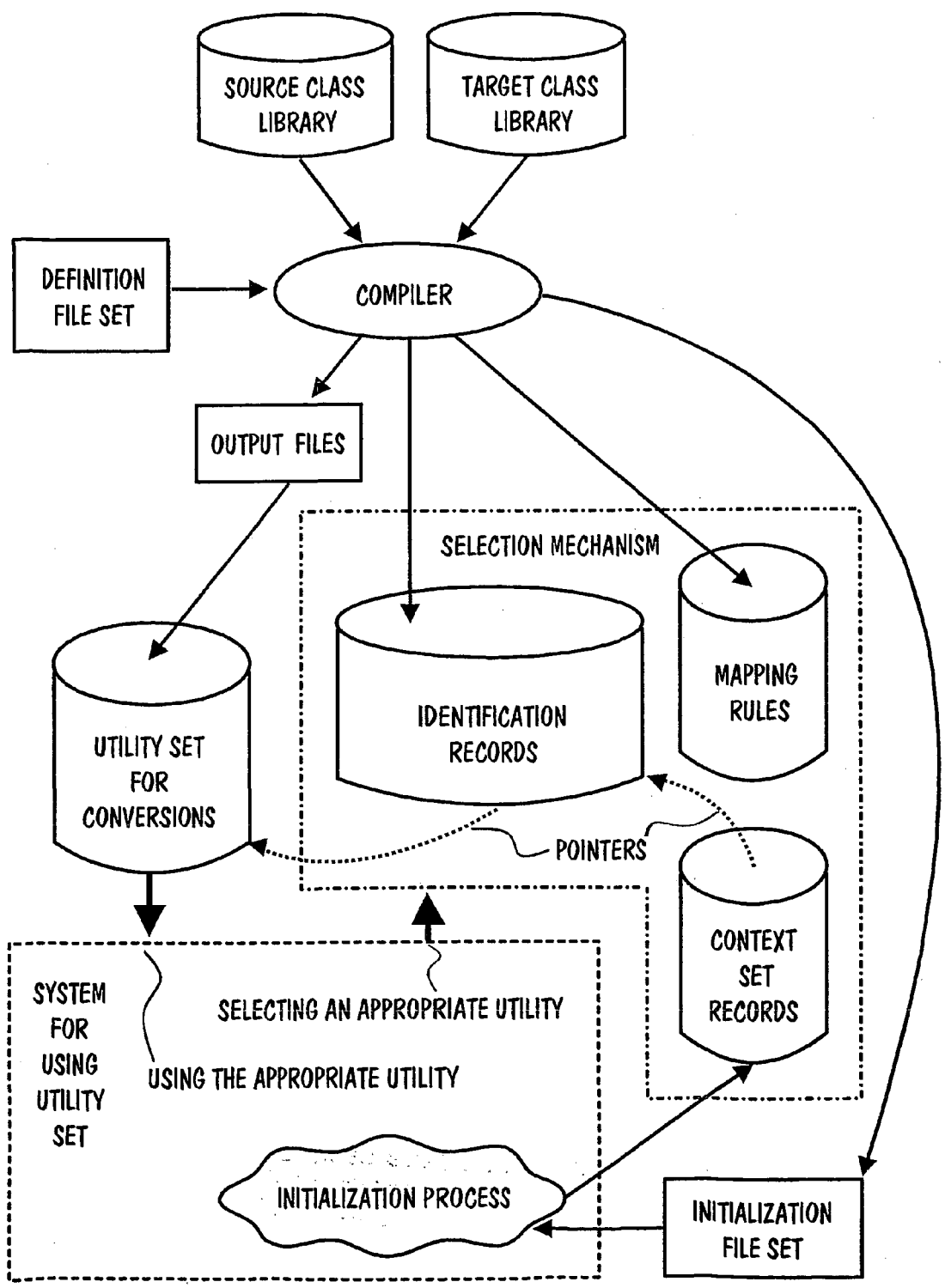
FIG. 4A depicts the compiler according to the invention, and the input which it reads and the output which it generates.

FIG. 4A depicts the compiler according to the invention, and the inputs which it reads and the output which it generates. The operation of the compiler is first discussed generally, without regard to the practical type of conversion performed.

The compiler reads:
the definition file set,
the class definitions from a first class library, and
the class definitions from a second class library.
The compiler generates:
the output file set, which includes classes; after compiling, the output file set results in the utility set for the conversions,
the second output file for the identification records of utilities,
the third output file for the mapping rules, and
the fourth output file for the initialization file set, from which the initialization process creates the fifth output file for the context set records.

The definition file set includes at least one ascii file which contains at least one definition. The definition file set of the NAC compiler includes ASN.1 definitions. The definition file of other compilers may include some other definitions.

The first and second class libraries read by the compiler contain classes, i.e. the ascii text of class definitions.

The second, third, and fifth output file are parts of the selection mechanism. Their content is described in more detail as follows.

The second output file includes the identification records. Each identification record is equipped with at least one pointer pointing to a utility stored in the utility set.

The third output file includes the mapping rules used to map dialog primitives corresponding to each other. For example, "SLEBegin" named or "SS7Begin" named dialog primitive starts a dialog between CORBA and the SS7 network. In this case, the mapping rule maps SLEBegin and SS7Begin.

The mapping rules are used as follows. When SLEBegin is initiated from CORBA, the mapping rules are read so that SLEBegin is used as a search key. When a mapping rule including SLEBegin is found, then also its substitutive, i.e. SS7Begin, is found.

There are many kinds of mapping rules possible, for example, mapping rules for operations, errors, type definitions, value definitions, etc. However, each mapping rule includes a pair of operations, or a pair of errors etc. so that the objects of each pair correspond to each other.

The fifth output file contains the context set records, which are used to solve problems arising from different versions of data structures. For example, different versions of a certain message set may include data structures intended for the same purpose but having different names. Or different versions of a certain message set may include data structures having the same name but different structures.

Each context set record includes attribute values which identify a certain context. In addition each context set record is equipped with a pointer pointing to an identification record stored in the second output file.

In regard to message sets, such as GIOP message sets, each message includes certain attribute values comparable to the values of the context set records. When the attribute values are matched with the values of the context set records, an appropriate context set record is found. This is how the selection of an appropriate utility for the data conversion begins.

Depending on the system in which the utility set is to be used, the selection mechanism may include all or only some of the three parts, i.e. the identification records, the mapping rules, and the context set records.

A selection mechanism of the IWU runtime system includes all said parts of the selection mechanism. On the other hand, the selection mechanism may be simple and include, for example, only the identification records.

Generally, what is needed in the conversions is to identify from the received message the version of the protocol. Then it is possible to find the corresponding versions of the utilities for the conversions. Different versions of the protocol may use different message sets which include different messages with different data structures. Therefore, different versions of utilities are needed to convert different data structures. The selection mechanism relates a certain version of a utility to a certain version of the protocol.

The identification of the protocol version is beneficially based on the inspection of message parameters, i.e. attribute values.

For example, if a fictional system uses only one dialog primitive, the mapping rules are not needed. In addition, if the only dialog primitive is always transmitted in a same data structure, the context records are not needed. To show this, we make the following assumptions: 1) the utility set contains utilities which are numbered from 1 to 99, 2) each identification record includes an ID of one utility, wherein the ID is some number from 1 to 99, and 3) the only dialog primitive in use in the fictional system includes a utility number from 1 to 99. When the fictional system is in operation, the system receives the dialog primitive and obtains the utility number stored in the dialog primitive.

Then the system finds the identification record having the same utility number as an ID of a utility. Finally, the system obtains from the identification record a pointer pointing to the utility.

Next we will describe in more detail the operation of the compiler, and after that the use of the selection mechanism.

It may assumed that the compiler reads the definition file set one definition at a time, and that at least some definitions contain class names. In addition, we assume initially that all definitions in the definition set belong to one message set.

When the compiler has read one definition from the definition file set, it executes the following steps:
  The compiler reads a definition from the definition file set and writes it into a memory.
  The compiler parses bit strings of the read definition, whereby a parsed class name is obtained as a result of the parsing.
  The compiler reads a first class corresponding to the parsed class name from the first class library and writes the first class into the memory.
  The compiler reads a second class corresponding to the parsed class name from the second class library and writes the second class into the memory.
  The compiler generates one wrapper class per each data structure to be converted, wherein the wrapper class is adapted to call a method of the first class and a method of the second class, wherein the said methods handle data of the same context.
  After this, the compiler writes each wrapper class generated and the first class and the second class into an output file set, which consists of at least one file.
  The output file set is compiled by a suitable compiler; the compilation results in a utility of the utility set.

When all definitions in the definition file are read and the above-mentioned steps are executed for each definition, the utility set is created. The utility set is used for converting data of the first format to data of the second format, and vice versa.

Related to the creation of the selection mechanism, the compiler further executes the following steps:
  The compiler generates identification records, each of which is equipped with a unique identifier and at least one pointer pointing to a utility.
  The compiler writes into the second output file the identification records.
  The compiler generates mapping rules so that each mapping rule maps the identifier of the first dialog primitive and the identifier of the second dialog primitive, wherein the first dialog primitive relates to data of the first format, and the second dialog primitive relates to data of the second format.
  Similarly, the compiler generates mapping rules for dialog primitives.
  In addition, the compiler generates attribute values for each mapping rule. These attribute values are used when the best match for a dialog primitive is to be found.
  The compiler writes the mapping rules into a third output file.

For the above we have assumed that all definitions of the definition set belong to one message set. The following is for cases when the definitions of the definition set belong to at least two message sets.

Related to the creation of the selection mechanism, the following further steps are executed:
  The compiler generates data for the context set records and writes the data into a fourth output file.

When creating context set records, an initialization process reads the fourth output file. The initialization process creates context set records so that each record includes at least one pointer pointing to an identification record and written in the second output file.

The initialization process writes the context set records into the fifth output file.

Figure 4B:
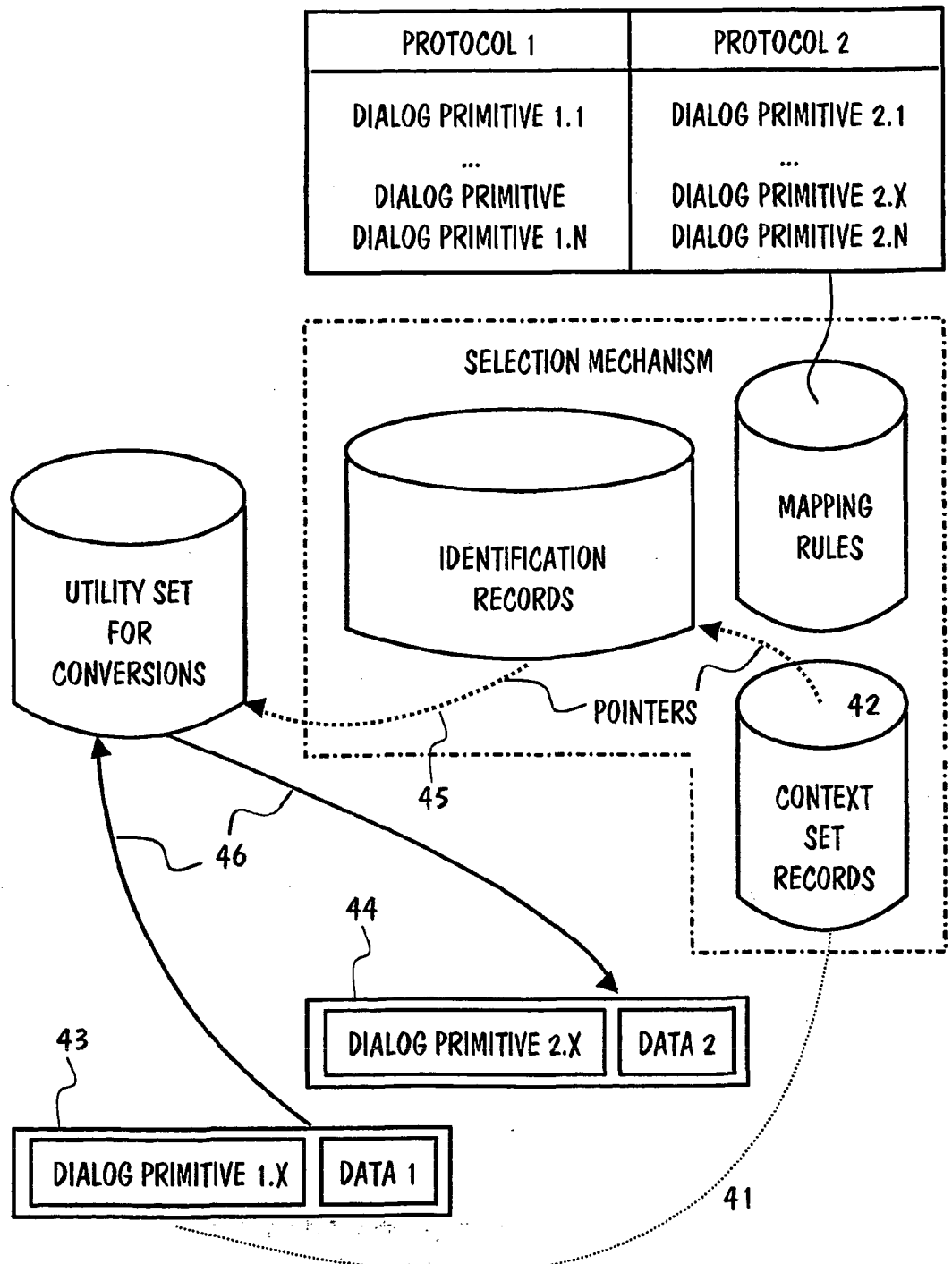
FIG. 4B depicts steps in data conversion and the use of mapping rules.

FIGS. 4A and 4B illustrate the system according to the invention. The system uses the selection mechanism created by the compiler.

The system according to the invention may be a runtime system of IWU. In that case, the system is part of a bridge which enables communication between the SS7 network and CORBA, and the utility set used by the system comprises utilities for BER-CDR conversions. However, the system is not necessarily a runtime system, nor a part of a bridge. Nor must the utilities be utilities for BER-CDR conversions.

There may be many versions of data formats which the system has to handle. First, the system must identify a version of a source format, and then, it must determine an appropriate version for a target format.

There may be, for example, different versions of GIOP and INAP/MAP message sets which may include different BER and CDR data structures.

Generally, an application starts a dialog with a certain dialog primitive, which may be located in a message or in a record of an event. In CORBA, for example, a dialog primitive named SLEBegin starts a dialog.

When the system according to the present invention receives a dialog primitive, it has to find answers to the following questions:

What context set does the dialog primitive relate to?
What operation or data definition does it include?
What utility ought to be selected for conversion?

The said context set may be a version of a message set, or of some other set of data structures. The selection mechanism obtains the answers to the above-mentioned questions.

FIG. 4B illustrates steps for the use of the selection mechanism. The following steps 41–46 refer to the steps shown in FIG. 4B.

When a new dialog is starting:
The system finds a context set record with the best match, wherein certain attribute values are the same as the attribute values of a dialog primitive received (step 41).
Then the system obtains at least one pointer pointing from the matching context set record to an identification record (step 42).

Thus, steps 41 and 42 are executed only when a new dialog is starting. Step 41 is simple if the attributes of the dialog primitive and the parameters of the context set records have the same name. Then it is easy to find the attributes and the parameters having the same name. Step 41 may also be as complicated as it is in the runtime system of IWU.

When the dialog has started, the system has at least one pointer pointing to an identification record. During the dialog, the system receives and transmits dialog primitives and executes the following steps:

The system obtains a first identifier from the dialog primitive received (step 43).
By using the mapping rules, the system generates a second dialog primitive which corresponds to the first dialog primitive received (step 44).
The system obtains data of the first format from the first dialog primitive, and converts the data of the first format to data of the second format by using 1) a pointer pointing from the context set record to an identification record, and then 2) a pointer pointing from the identification record to a utility, and lastly 3) a method of the utility (step 45).
The system executes the method of the utility, which converts the data of the first format to the data of the second format (step 46).

The following example describes how the runtime system of the IWU proceeds when it receives a dialog primitive.

In IWU each identification record is equipped with an ASN.1 operation ID as an ID value of a utility. If the dialog primitive is initiated from the SS7 network, it includes an ASN.1 operation ID. Then the operation ID stored in the dialog primitive can be used as a search key when searching the identification record which has the same operation ID. Otherwise, if the dialog primitive is from CORBA, the operation ID is an IDL operation ID. Then the runtime system of the IWU uses the mapping rules to obtain the ASN.1 operation ID corresponding to the IDL operation ID. With the ASN.1 operation ID, the runtime system of the IWU uses it as a search key.

The following example describes how the runtime system of the IWU proceeds when it has found an identification record as described above.

In the IWU each identification record is equipped with: 1) a first pointer to the method of the utility, which method converts BER data to CDR data, and 2) a second pointer to the method of the utility, which method converts CDR data to BER. If the dialog primitive is initiated from the SS7 network, the runtime system of the IWU chooses the first pointer. Otherwise, if the dialog primitive is initiated from CORBA, the runtime system of the IWU chooses the second pointer. Then the runtime system of the IWU executes the method which is pointed to by the chosen pointer.

Next we will describe in detail the operation of the compiler named "NAC". After that, we will describe the operation of the runtime system of IWU.

The NAC Compiler

Figure 6A:
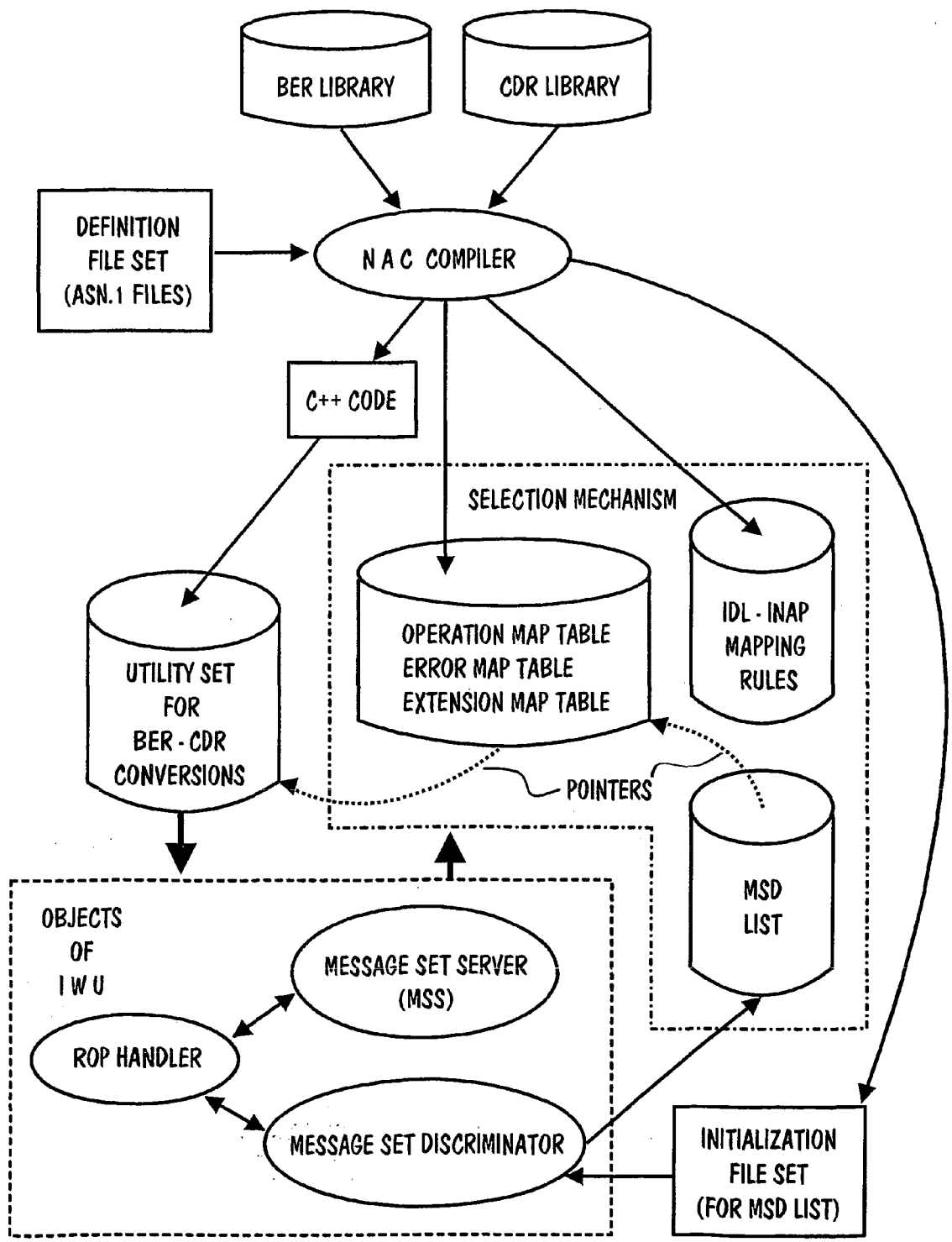
FIG. 6A depicts the compiler according to the invention which is used for BER-CDR conversions.

FIG. 6A shows the NAC compiler, which reads three input items and generates four output items.

The NAC reads:
A definition file set, which is composed of ASN.1 files, class definitions from a BER library, and
class definitions from a CDR library.

The NAC compiler generates:
an output file set for the C++ code; after compilation, the C++ code results in the utility set for BER-CDR conversions;
a second output file for Operation, Error, and Extension Map Tables; these tables are used to obtain an appropriate utility for a current BER-CDR conversion;
a third output file for IDL-INAP mapping rules; these mapping rules are needed for obtaining an analogous INAP operation for an IDL operation, or vice versa;
a fourth output file for the initialization file set; this file set is used when creating an MSD list, which is the fifth output file.

The second, third, and fifth output files of the NAC compiler compose the selection mechanism for selecting the correct utility. The selection mechanism is used by the runtime system of IWU.

The C++ code generated includes wrapper classes. The wrapper classes are also C++ classes, which are generated at the same time as other C++ code. The wrapper classes provide a method for decoding BER and encoding into CDR, and a method for decoding CDR and encoding into BER. Both the methods execute the decoding and encoding in one phase, which makes the conversions more efficient.

The above-mentioned MSD list, i.e. the Message Set Discriminator list, is used by the runtime system of IWU. In detail, an object named Message Set Discriminator of the runtime system of IWU uses the MSD list in order to find out to which message set each received message belongs.

Generating the C++ code. In the NAC compiler two new methods are needed in order to create classes that convert BER to CDR and vice versa without ASN.1 instances and IDL instances. These methods are called AsnToCDR and CDRToAsn. The methods require the writing of an enveloping library over the BER and the CDR libraries. The enveloping library, named Universal Type library, makes it possible to execute the conversions in one phase.

The NAC compiler generates the C++ code for BER-CDR conversions. The C++ code includes a nested structure which comprises the following new methods:
CDRToAsn (in place of the BEncPdu method of the Snacc compiler) and
AsnToCDR (in place of the BDecPdu method of the Snacc compiler).
The generated C++ code further includes these methods:
BEnc,
BDec,
BEncContent, and
BDecContent.

The BEnc and BDec methods are comparable to the methods of the Snacc compiler except for the extra parameters that are passed to the BEnc and the BDec. The BEncContent and BDecContent methods are extended to include calls to the corresponding CDR library method.

UniversalInt is one of the wrapper classes that comprise the Universal Type library. The NAC compiler uses the methods of a Universal type library when generating the C++ code for BER-CDR conversions. The NAC compiler uses, for example, the UniversalInt wrapper class in addition to the AsnInt class.

In the code generation phase, the compiler generates a function call tree structure. The hierarchy structure of the generated code corresponds to the structure of the data types presented as input to the compiler. This means that depending on how the data types have been nested, the decoding routines of different data types call each other. For example, if datatype1 contains datatype2 in its structure, the decoding function of datatype1 calls the decoding function of datatype2.

The NAC compiler reads BER encoded ASN.1 data structures from its input files. These data structures are named briefly the BER data structures. The grammatical parser of the NAC compiler forms an internal representation for each BER data structure. The internal representation is a tree structure in which the tree nodes correspond to the fields of the BER data structure. If a field of the BER data structure is a structured field, then the node corresponding to that field has child nodes which may have their own child nodes. Child nodes having the same parent node are siblings.

All nodes of said tree structure are function calls. The root node of the tree corresponds to the function which converts BER encoded data to CDR encoded data or vice versa. The child nodes of the root node correspond to the arguments which are passed as arguments to the function. Normally, one argument corresponds to the input stream, i.e. the bit string, and another corresponds to the output stream. If an argument is a structured type, also the argument has child nodes. During a conversion all the nodes of the function call tree are passed through, which results in the conversion between BER encoded data and CDR encoded data.

The following example concerns principles which picture how the function call tree is composed. In the example, "struct3" and "struct4" data structures have the same parent data structure, i.e. "struct1", therefore, "struct3" and "struct4" are siblings. The notation used is based on LISP. However, some other notation can be used as well. A BER data structure always includes a tag, a length, and a value.

If a BER data structure is as follows:

```
TYPE1
    struct2    TYPE2
ENDTYPE1
TYPE2
    struct3    TYPE3
    struct4    TYPE4
ENDTYPE2,
``` then its logical structure would be:
(Tag1 Len1 (Tag2 Len2 (Tag3 Len3 Val3 Tag4 Len4 Val4))).

Correspondingly, its physical structure would be:
{Tag 1,Len1,Tag2,Len2,Tag3, Len3,Val3,Tag4,Len4, Val4}.

In these structures each 'Tag' starts a type to be converted, each 'Len' announces the length of the type, and each 'Val' announces the value stored to the type.

Before calling a decodeLIST termed function, the contents of the BER stream is:
{Tag 1,Len1,Tag2, Len2,Tag3, Len3,Val3,Tag4,Len4, Val4}

The decodeLIST function is called with the BERstream parameter and a CDRstream parameter, which is at first empty. The example below illustrates how the list, i.e. the input stream structure, is traversed during the decoding:

```
BERstream :=
{Tag1,Len1,Tag2,Len2,Tag3,Len3,Val3,Tag4,Len4,Val4}
...
decodeLIST(BERstream,CDRstream)
...
decodeLIST(BERstream,CDRstream)
{
    detect TYPE 1 Tag (="Tag1") in BERstream
    CDR encode TYPE1 Tag to CDRstream
    /* Extract TYPE1 Value from BERstream */
    BERstream := TYPE1 Value from BERstream
    ...
    /* Here BERstream =
    {Tag2,Len2,Tag3,Len3,Val3,Tag4,Len4,Val4}*/
    ...
    decodeTYPE1(BERstream,CDRstream)
}
decodeTYPE1(BERstream,CDRstream)
{
    detect TYPE 2 Tag (="Tag2") in BERstream
    CDR encode TYPE2 Tag to CDRstream
    /* Extract TYPE2 Value from BERstream */
    BERstream := TYPE2 Value from BERstream
    ...
    /* Here BERstream = {Tag3,Len3,Val3,Tag4,Len4,Val4} */
    ...
    decodeTYPE2(BERstream,CDRstream)
}
decodeTYPE2(BERstream,CDRstream)
{
    ...
```

-continued

```
    /* Here BERstream = {Tag3,Len3,Val3,Tag4,Len4,Val4} */
    ...
    detect TYPE3 Tag (="Tag3") in BERstream
    CDR encode TYPE3 Tag to CDRstream
    /* Extract TYPE3 Value from BERstream */
    BERstream 1 := TYPE3 Value from BERstream
    ...
    /* Here BERstream1 = {Val3} */
    ...
    decodeTYPE3(BERstream1,CDRstream)
    /* This routine CDR-encodes Val3 to CDR stream */
    detect TYPE4 Tag (="Tag4") in BERstream
    CDR encode TYPE4 Tag to CDRstream
    /* Extract TYPE4 Value from BERstream */
    BERstream2 := TYPE4 Value from BERstream
    ...
    /* Here BERstream2 = {Val4} */
    ...
    decodeTYPE4(BERstream2,CDRstream)
    /* This routine CDR-encodes Val4 to CDR stream */
}
```

In the above, the target stream, e.g. the CDR encoded stream, is encoded, while the source stream, e.g. BER encoded stream, is being decoded. However, the encoding and decoding is not restricted to BER and CDR format, but applies to all formats. What is essential to the example above is that the conversion of the coding from one format to the other is performed while parsing the coding of the source format. The conversion is embedded in the process of decoding the structure of the source format.

Further, it should be noted that the above example is quiescent about details related to the parameter passing, i.e. as to whether "call by value" or pointer parameters are used.

The above example is quiescent on the specific issues related to the encoding of values and lengths in the target format stream, i.e. the CDRstream. The encoding can be performed differently. The BER data structure shown above is also an example of a pre-order for a data structure. A post-order for the BER data structure would be:

{Len1,Tag1,Len2,Tag2,Len3,Val3,Tag3,Len4,Val4, Tag4}

In the post-order, a 'Len' and a 'Val' are before a 'Tag'. In the pre-order, a 'Tag' is before a 'Len' and a 'Val'. A source format can be represented in pre-order or in post-order, and a target format can be represented in pre-order or in post-order. A source format and a target format may have the same order, but they may also have different orders.

A data structure of a target format may include as many fields as a data structure of a source format. However, it is also possible that a data structure of a target format has a different count of fields than a source format. A logical structure of a target format may be the same as a logical structure of a source format, but the logical structures may differ from each other.

The above shown BER data structure includes two fields:

'struct2.struct3' field for 'Val3' and

'struct2.struct4' field for 'Val4.'

The BER data structure may be converted into the following CDR data structure:

```
                    TYPE5
        struct6         TYPE6
        struct7         TYPE7
                    ENDTYPE5
                    TYPE7
        struct8         TYPE8
                    ENDTYPE7
                    TYPE8
        struct9         TYPE9
                    ENDTYPE8
```

In this case the CDR data structure has the same count of fields as the BER data structure but a different logical structure. The CDR data structure shown includes the following fields:

'struct6' field for 'Val3' and

'struct7.struct8.struct9' field for 'Val4'.

Here 'struct6' does not include any nested structures. However, a data structure resulting from a conversion may include two nested data structures, such as 'struct7.struct8.struct9', or the data structure may include more than two nested data structures.

It is possible that the source format does not include any 'Len'. Then the length of the field may be concluded using a 'Tag'. Alternatively, a 'Val' may include a field end marker. For example, two bytes having the value 0 may represent the field end marker.

We have described above how a source format and a target format may differ from each other. In any case, the generation of a target format is executed by using the coding rules. The coding rules include at least rules which map a 'Tag' of a source format to a 'Tag' of a target format. There may also be coding rules for mapping 'Len's and 'Val's.

It is also possible that in the target format there are no data type tags for the data structure elements. Instead, the data types in the target format could be implicit from the context. This means, for instance, that the receiver of the target bit string knows, from the received message type or other indicators in the message, the data type structure to be applied for the target bit string. This means, for instance, that the receiver manipulates the received target bit string via a data type mask placed on top of the received bit string.

Therefore, the only thing that is needed in the encoding of a data structure element into the target format is to have the correct representation of its value i.e. 'Val' in the target bit string format. What is needed, is knowledge of the target format coding representation for different data types. For example, given an ASN.1 SEQUENCE-structure, the representation for a sequence of elements in the target bit string needs to be known.

Another example is how various general data types, such as integers, floating numbers and byte strings, are encoded in the target format. In the case of integers, what matters is the length of integers in the target format, how the sign is encoded, and whether the most significant bit is the first or the last. In the case of floating numbers what matters is the encoding of the mantissa and the characteristics comprising their lengths etc.

As in the description of the background of the invention, the following two examples concern the conversion of the "InitialDpArg" named data structure, which is BER encoded. Again we are assuming that also the corresponding CDR data structure is named the "InitialDpArg".

Again we are assuming that the definition for the "InitialDP" operation is a file named "operation.asn":

```
CS1OPErationTypes DEFINITIONS ::=
                ...
    InitialDP                    ::= OPERATION
         ARGUMENT   InitialDPArg
         ERRORS {
                ...}
    InitialDP                    OPE ::= OBJECT {
         &Arg              InitialDPArg
         &Err{
                ...}
```

We are also assuming that the definition for InitialDPArg argument is given in another file that may be named "argument.asn":

```
InitialDPArg ::= SEQUENCE {
    serviceKey            [0] ServiceKey,
    ...
    redirectionInformation  [30] RedirectionInformation
    ...}
```

The output class is generated by using the definitions which are stored in the "operation.asn" file and the "argument.asn" file. The output class, written in its own file, is given below:

```
class InitialDPArg_c: public AsnType
{
    public:
    struct InitialDPArg_s {
        ServiceKey_c serviceKey;
        ...
        RedirectionInformation_c *redirectionInformation;
        ...
        InitialDPArg_s( );
        InitialDPArg_s (const InitialDPArg_s &);
        ~InitialDPArg_s( );
        InitialDPArg_s &operator = (const InitialDPArg_s &); };
    AsnType     *Clone( ) const;
    AsnLen      BEncContent (BUF_T b, CDR_INPUT_BUF c);
    Void        BDecContent (BUF_T b,CDR_OUTPUT_BUF c,
                             AsnTag Tag, AsnLen elmtLen,
                             AsnLen &bytesDecoded);
    AsnLen      BEnc (BUF_T b, CDR_INPUT_BUF c);
    Void        BDec (BUF_T b, CDR_OUTPUT_BUF c,
                             AsnLen &bytesDecoded);
    static int  CDRToAsn (BUF_T b, CDR_INPUT_BUF c,
                             AsnLen &bytesEncoded);
    static int  AsnToCDR (BUF_T b, CDR_OUTPUT_BUF c,
                             AsnLen &bytesDecoded);
    int         BEncPdu(BUF_T b,AsnLen &BytesEncoded);
    int         BDecPdu(BUF_T b,AsnLen &BytesDecoded);
};
```

The output class contains the functions for BER-CDR conversions (AsnToCDR and CDRToAsn). Similarly, an output class corresponding to an error defined in the ASN file is written in its own file.

Like the Snacc compiler, also the NAC compiler processes the data structure field by field, and it calls methods which generate ASN.1 C++classes.

EXAMPLE 3

Figure 1:
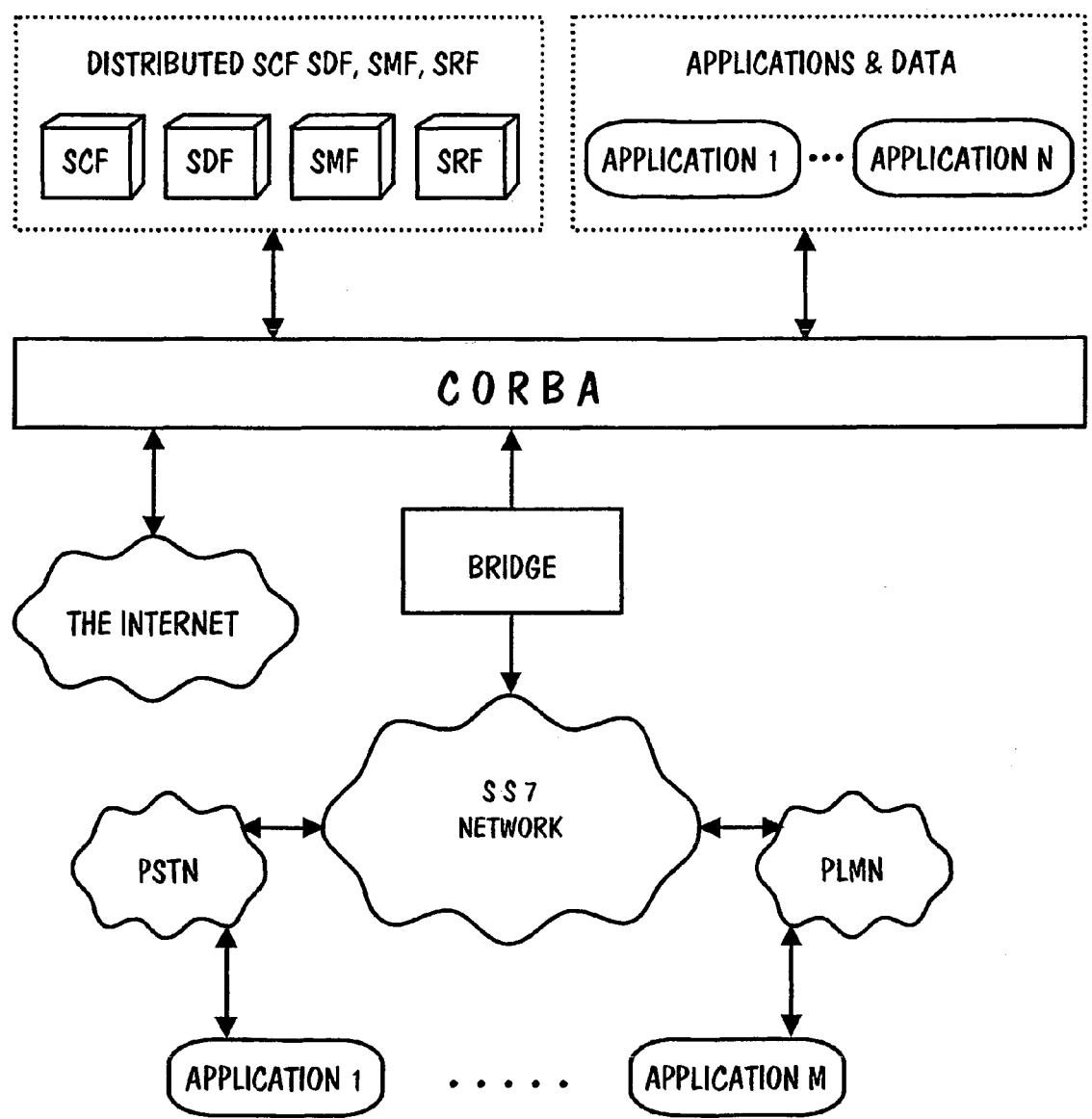
FIG. 1 illustrates CORBA architecture.
Figure 2:
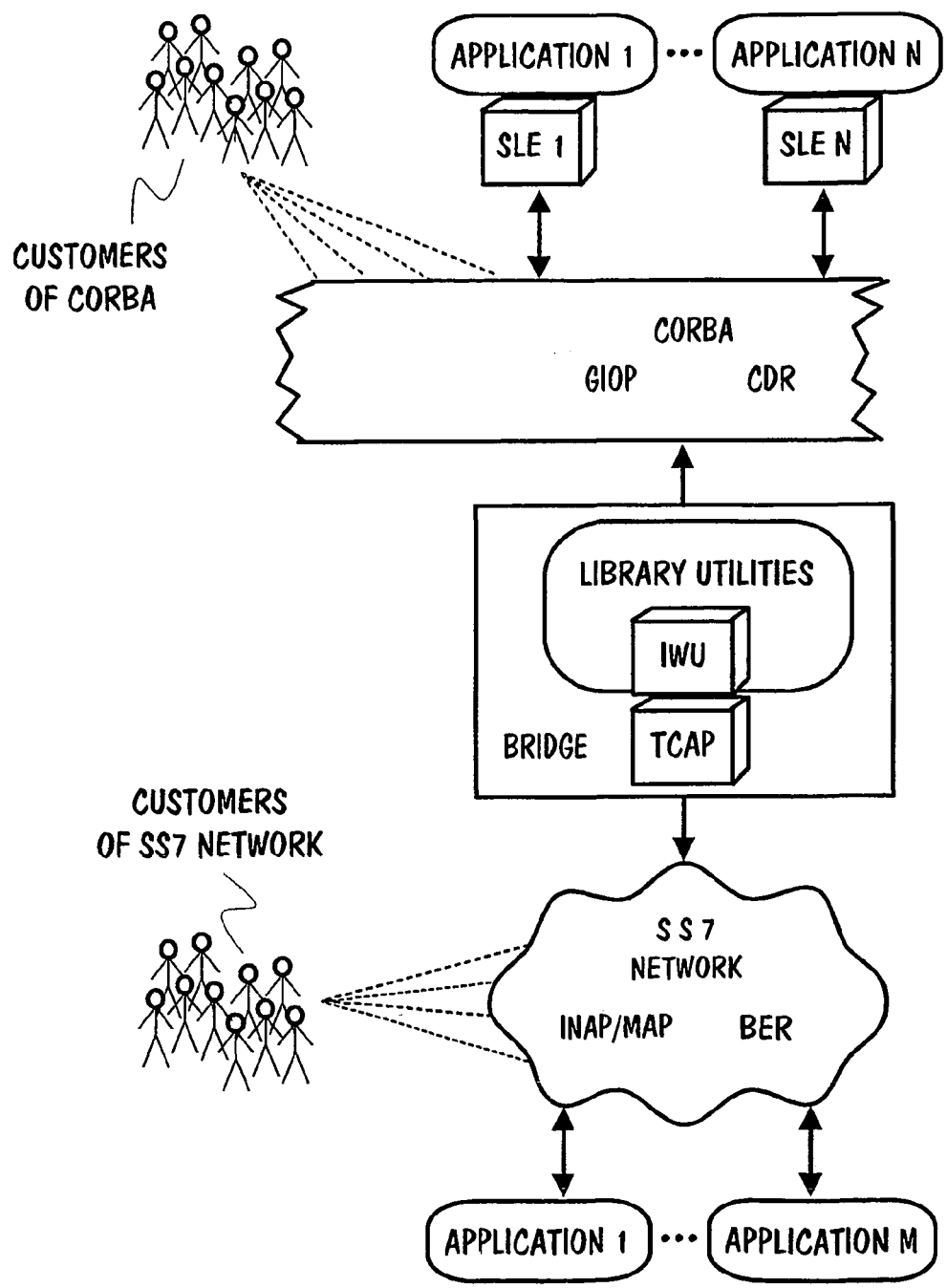
FIG. 2 illustrates IWU as a bridge between the SS7 network and CORBA.
Figure 3A:
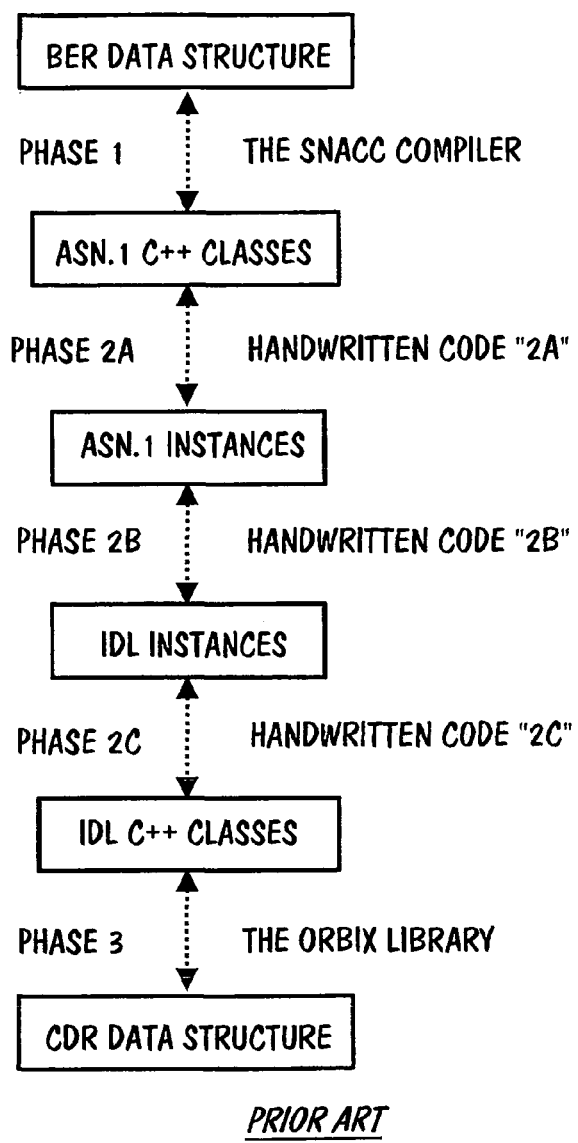
FIG. 3A depicts bi-directional BER-CDR conversion in prior art according to the present invention.
Figure 3C:
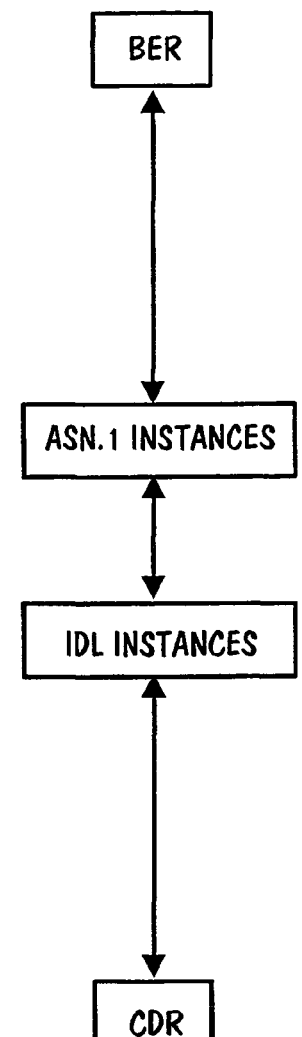
FIG. 3C depicts BER encoded data being instantiated to ASN.1 instances.
Figure 3B:
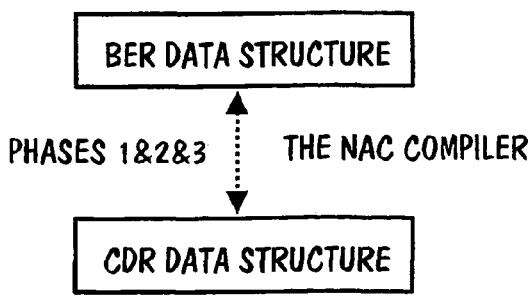
FIG. 3B depicts the bi-directional BER-CDR conversion.

Generating the C++ Code which Converts BER to CDR (see FIG. 3B).

The NAC compiler generates the C++ code for each field of the InitialDPArg data structure so that the code includes the following method calls of the Universal Type library in the following order:

the BDecPdu and BDec method calls of the InitialDpArg class, the BDecContent method call of the InitialDpArg class, which in turn calls the BDecContent method of the AsnType class.

The AsnToCDR method of the WrpInitialDpArg.

Thus, there is only one phase in which the AsnToCDR method in the WrpInitialDpArg class is called (this phase is termed "1&2&3" in FIG. 3B). The other methods used in the C++ code generation are BDec and BDecContent methods of the InitialDpArg class.

EXAMPLE 4

Generating the C++ Code which Converts CDR to BER (see FIG. 3B).

The NAC compiler generates a C++ code for each field of the InitialDPArg data structure so that the C++ code includes the following method calls of the Universal Type library in the following order:

The CDRToAsn method of the WrpInitialDpArg.

The BEncContent method of the InitialDpArg class, which in turn calls the BEncContent method of the AsnType class.

The BEnc and BEncPdu methods of the InitialDpArg class.

Figure 3D:
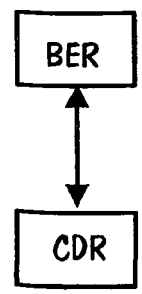
FIG. 3D depicts BER encoded data being transformed to CDR encoded data.

FIG. 3D shows that BER encoded data are transformed in one phase to CDR encoded data and vice versa.

Now we can compare examples 3 and 4 to the examples 1 and 2 described above.

As shown in FIG. 3A, the Snacc compiler generates the ASN.1 C++ classes, which include data types and encoding/decoding functions. At least some of these data types are used as an interface for the encoding/decoding functions. In other words, variables passed as arguments to the functions are accordant with the data types generated by the Snacc compiler. A programmer has to write the program "2A", which sets values to the variables and passes the variables as arguments to the BER encoding functions. Program "2A" gets values from the variables that have been passed as arguments to the BER decoding functions. In addition, the programmer has to write programs "2B" and "2C".

As shown in FIG. 3B, the NAC compiler generates all the needed C++ code. The C++ code is compiled, and it results in the utility for the BER-CDR conversion.

FIG. 3C describes how a generated utility may execute the BER-CDR conversions in prior art. In prior art, the BER-CDR conversions are executed in at least three phases.

Correspondingly, FIG. 3D describes how a utility generated by the NAC compiler executes the BER-CDR conversions. The BER-CDR conversions are executed in one phase, which speeds the process of conversion.

Generating the Operation, Error and Extension Map Tables. A syntax transfer defines mappings between ASN.1 and CORBA. This mapping is executed as a runtime operation within IWU by using an IDL interface.

The IDL interface is needed to support syntax transfer. The NAC compiler reads ASN.1 macro definition files and generates the IDL interface so that:

each ASN.1 operation macro definition is mapped to an IDL operation, each ASN.1 error macro definition is mapped to an IDL user exception, and each ASN.1 extension macro definition is mapped to an IDL construct.

In addition, the NAC reads arguments to ASN.1 operations and ASN.1 data definitions (TypeDefs and Valuedefs) and generates the IDL interface so that:

each ASN.1 argument is mapped to an IDL type, each ASN.1 type definition is mapped to an IDL type definition, and each ASN.1 value definition is mapped to an IDL value definition.

An ASN.1 error macro, an extension macro, an argument, a type definition, and a value definition mentioned above belong to some ASN.1 operation macro. ASN.1 operation macros are mapped to INAP operations, which are mapped to IDL operations. Therefore ASN.1 operation macros can be mapped to IDL operations and vice versa.

The ASN.1 extension macro mappings are more complex than the other ANS.1 mappings, and thus they are discussed more closely.

An ASN.1 operation macro may include one or more extension macros. This kind of ASN.1 macro and its extension macros are mapped in an IDL operation. However, if an ASN extension macro includes so-called 'ANY'-values, also typecode information is needed.

'ANY'-value is a value of an arbitrary type. Thus so called typecode information must be related to an 'ANY'-value in order to inform a receiver which kind of data the 'ANY'-value includes.

The IDL interface is assigned to the following tables, which are used to find the appropriate utility for the BER-CDR conversion:

an Operation Map Table, where function pointers for BER-CDR conversions are stored, an Error Map Table, where function pointers for BER-CDR conversions are stored (and used if an error occurs), and an Extension Map Table for manipulating the typecode of the type present in the 'ANY'-value which is passed in case of extensions.

The tables contain more information than listed above. That information is listed fully below in connection with the description of a Message Set Discriminator, which is one object of the runtime system used in IWU.

The typecode information is stored in the Extension Map Table consisting of the following parameters:

Extension Id,
Extension Name,
TypeCode Information for the AsnType,
AsnToCdr function pointer for the AsnType, and
CdrToAsn function pointer for the AsnType.

All the parameters listed, except the typecode information, are given a value from the information present in ASN.1 source files, or the value is generated by the NAC compiler. The typecode information is obtained from an Interface Repository file.

When a dialog primitive containing BER data arrives during runtime, the dialog primitive may include 'ANY'-value and an ExtensionID. By using the ExtensionID as a key, the appropriate typecode information is obtained from the Extension Map Table, and the appropriate AsnToCDR function pointer is found from the Extension Map Table. Then 'ANY'-value is converted to CDR data by using the AsnToCDR function, and the CDR data and the type code information are sent to a receiver.

Correspondingly, when a dialog primitive containing CDR data arrives during runtime, it may include 'ANY'-value and an ExtensionID. By using the ExtensionID as a key, the appropriate CDRToAsn function pointer is found in the Extension Map Table, and the CDRToAsn function is used when converting the 'ANY'-value to BER-data.

Generating the IDL-INAP mapping rules. IDL operations may be classified as synchronous and asynchronous operations. Alternatively, the IDL operations may be classified according to what a performer of an IDL operation is expected to report.

Both of these classifications are taken into consideration in the following IDL operation classification defined by ITU.

Class 1: Synchronous, reporting success or failure (result/error)

Class 2: Asynchronous, reporting success or failure (result/error)

Class 3: Asynchronous, reporting failure (error) only

Class 4: Asynchronous, reporting success (result) only

Class 5: Asynchronous, outcome not reported

The following INAP operation classes are defined by ITU.

Class 1: ANS.1 operation macro reporting result and error

Class 2: ANS.1 operation macro reporting error only

Class 3: ANS.1 operation macro reporting result only

Class 4: ANS.1 operation macro reporting neither result nor error

IDL and INAP operation classes have to be mapped in some way to enable BER-CDR conversions. The NAC compiler maps the operation classes in the following way:

IDL operation class 1 is not mapped to any INAP class

IDL operation class 2 is mapped to INAP class 1

IDL operation class 3 is mapped to INAP class 2

IDL operation class 4 is mapped to INAP class 3

IDL operation class 5 is mapped to INAP class 4

In addition to providing the optimised transfer syntax i.e. encoding conversion for data structures defined using ASN.1 definition language, the compiler, in an embodiment of the invention also produces IDL definitions from the ASN.1 language definitions. The mentioned coding rules are used in this conversion. Therefore, the coding rules are used to convert the ASN.1 definitions to IDL definitions. The produced IDL is an instance of the original ASN.1 definition produced using coding rules.

Generating the initialization file set. Below is a brief example of an initialization file generated by the NAC compiler:

```
// F5INAP message set
    #include "asn-incl.h"
    #include "Map.hh"
    #include "String.hh"
    #include "f5inopgx-OpMap.h"
    #include "f5inergx-ErrorMap.h"
    class wrplibMapRow {
public:
    OTC_String           messageSetName;
    AsnOid               *ptr2ApplContextNames;
    OTC_String           repId;
```

-continued

```
OpMapContainer        *ptr2OpMap;
ErrorMapContainer     *ptr2ErrorMap;
ExtensionMapContainer *ptr2ExtMap;
};
etc
```

The Runtime System of the IWU

FIG. 6A shows objects of IWU, or more particularly, the objects of the runtime system of the IWU which deal with the selection mechanism and execute BER-CDR conversions. FIG. 4A, which represents a general system for conversions, and FIG. 6A, have the following correspondence:

the utility set for BER-CDR conversion in FIG. 6A corresponds to the utility set for conversions in FIG. 4A, the Operation, the Error, and the Extension Map Tables in FIG. 6A correspond to the identification records in FIG. 4A, IDL-INAP mapping rules in FIG. 6A correspond to the mapping rules in FIG. 4A, and the MSD list in FIG. 6A corresponds to the context set records in FIG. 4A.

The runtime system of the IWU deals with associations between applications. These associations are termed ROP associations. Each ROP association is related to one dialog.

Figure 5:
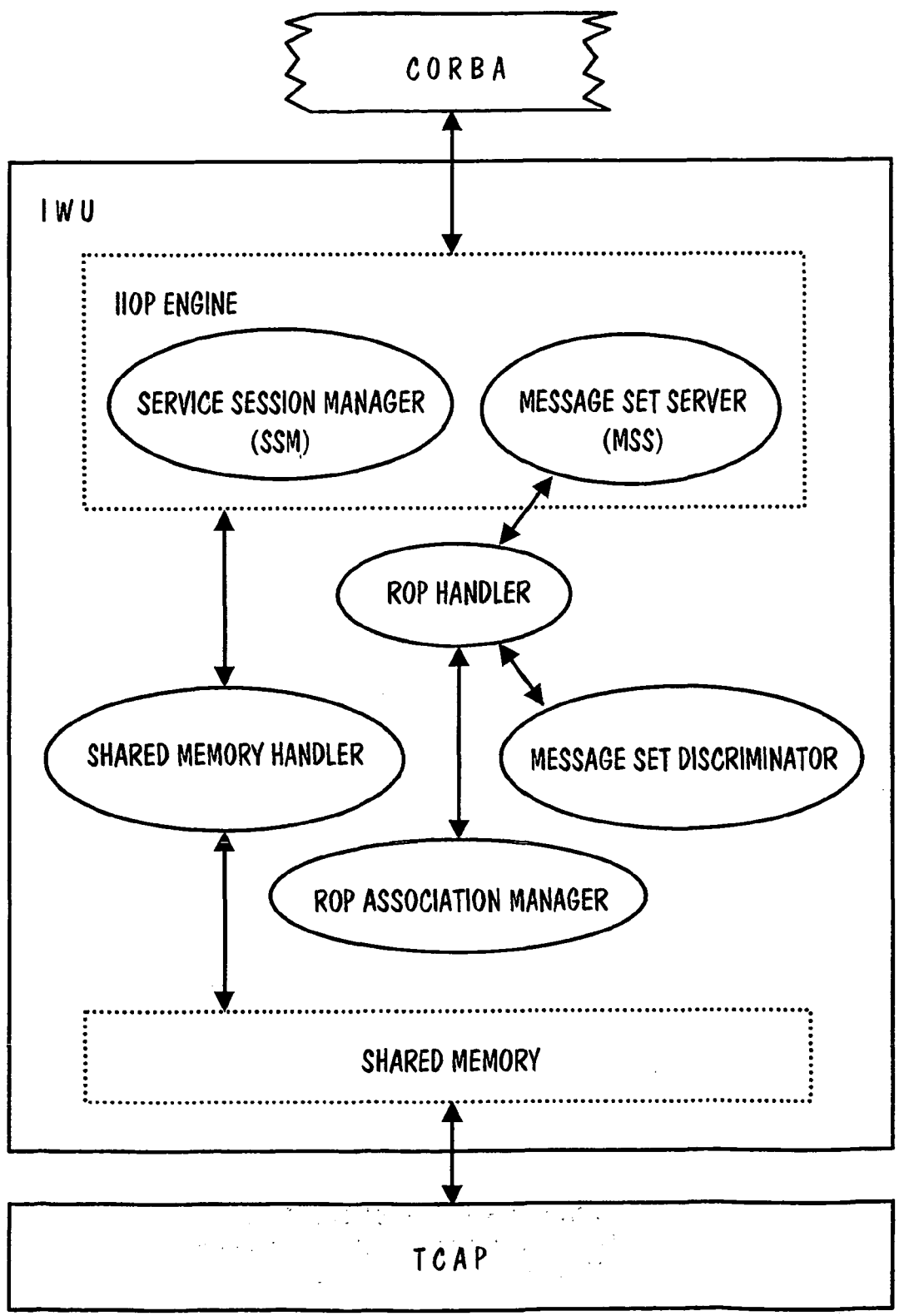
FIG. 5 presents objects of a runtime system used in IWU.

FIG. 5 shows IWU and TCAP processes composing a bridge between the SS7 network and CORBA. They communicate with each other using a shared memory.

The IIOP Engine shown in FIG. 5 consists of the Service Session Manager object and the Message Set Server object. It provides an interface for the applications that need to communicate using CORBA standard interoperability. Therefore IWU can act as a CORBA client or a CORBA server. Correspondingly, TCAP can act as a client or a server of the SS7 network.

FIG. 5 depicts the six most relevant objects of the runtime system used in the IWU. Below, the operation of each object is discussed.

(1) A Service Session Manager handles dialog primitives. It is responsible for handling dialogs between TCAP and SLEs. Here are some examples of such dialogs.

When TCAP receives an SS7Begin dialog primitive in a message from an application of the SS7 network, it creates a record of an SS7Begin event and stores it into the shared memory.

The Service Session Manager receives the record of the SS7Begin event from the shared memory. Then the IWU creates a new ROP association and informs the SLE about the new ROP association by sending a message.

Finally, the SLE may terminate the ROP association by sending an SS7End dialog primitive in a message. In that case, the Service Session Manager creates a record of the SS7End event and stores it in the shared memory. When TCAP receives the record of the SS7End event from the shared memory, it informs the SS7 network about the termination of the ROP association by sending a message.

Correspondingly, when the IWU receives an SLEBegin dialog primitive in a message from an SLE, it creates a new ROP association. The IWU creates a record of an SLEBegin event and stores it into the shared memory. Then TCAP receives the record of the SLEBegin event from the shared memory and informs an application of the SS7 network of the new ROP association by sending a message.

(2) A Message Set Server handles dialog primitives. It is responsible for the handling of BER data before sending a message to an SLE, or when receiving a message from an SLE. The Message Set Server (MSS) communicates with the remote MSS located in a certain SLE. This MSS and the remote MSS communicate by using GIOP messages.

The MSS receives a dialog primitive and pointers to the Operation Map Table, the Error Map Table, and the Extension Map Table from the ROP Handler, and the ROP handler receives the pointers from the Message Set Discriminator.

The MSS uses the pointers when choosing the appropriate method for converting data stored in the dialog primitive. The MSS obtains an operation ID and an operation class from the dialog primitive received.

The operation class defines which table the MSS must use. For example, if the operation class is "error", the MSS uses the Error Map Table.

The Operation, Error, and Extension Map Tables are equipped with an ASN.1 operation ID. Thus, if the dialog primitive is from the SS7 network, it includes an ASN.1 operation ID which can be used as a search key. Otherwise, if the dialog primitive is from CORBA, the MSS uses IDL-INAP mapping rules to obtain a corresponding ASN.1 operation ID. After receiving the ASN.1 operation, ID the MSS searches the table (e.g. the Error Map Table) for a record which has the same ASN.1 operation ID.

In this phase the MSS has pointers to an appropriate utility. The MSS has to determine a conversion direction. If the dialog primitive is from the SS7 network, the conversion direction is from BER to CDR. Otherwise, the conversion direction is from CDR to BER.

According to the conversion direction, the MSS selects from the record a pointer to an AsnToCDR method or a pointer to a CDRToAsn method. Lastly, the MSS converts data of the dialog primitive by using the method of the appropriate utility.

(3) The Shared Memory Handler writes and reads records of the events in the shared memory. Any object can use it that is intended for reading or storing the records of the events. The Shared Memory Handler assigns a sequence number to each record of an event and writes it in the shared memory. Once the event has been properly dealt with, it deletes the record of the event from the shared memory.

(4) An ROP Association Manager object is responsible for ROP associations. An ROP association forms a logical binding between two applications. Each ROP association includes the dialog ID, the originating point code and the destination point code, references of the local and remote Service Session Manager, etc.

The ROP Association Manager provides means for creating, updating, and ending the ROP associations for events coming from TCAP or the SLE.

(5) The ROP handler executes BER-CDR conversions between TCAP and an SLE by using the MSS.

At the beginning of a dialog, when the ROP Handler receives an SS7Begin or a SLEBegin, it uses the Message Set Discriminator to obtain the Operation Map, Error Map, and Extension Map Table pointers. After that it transmits said pointers and a dialog primitive to the MSS, which executes required BER-CDR conversion for data stored in the dialog primitive.

(6) The Message Set Discriminator differentiates between the message sets. In addition, it simultaneously operates as an initialization process as shown in FIG. 4A.

As described above, the NAC compiler creates the Operation Map Table, the Error Map Table, and the Extension Map Table, and the initialization functions for them. The message set discriminator initializes the tables by using the initialization functions at the time of the IWU startup.

The Initialization of the tables is carried out by reading initialization values and by calling the initialization functions with the initialization values. The initialization values are stored in certain initialization files. Each message set has its own initialization file.

The Message Set Discriminator also maintains certain fields of the Operation Map Table, Error Map Table, and Extension Map Table. The tables are maintained by adding a new entry to the LDAP directory or deleting an entry from the LDAP directory.

The records of the Operation Map Table, the Error Map Table, and the Extension Map Table include pointers pointing to encoding and decoding functions. The pointers in the tables enable the calling of an exact encoding/decoding function for the current dialog primitive.

The Operation Map Table contains the following parameters:
An ID parameter is the identifier of the operation to be invoked.
An Operation Name parameter is the name of the operation to be invoked.
A TimeOut parameter is the argument of the invoked operation that tells the time (in milliseconds) when it will expire.
An OperationClass parameter defines whether a synchronous or an asynchronous reply is expected. This parameter also defines the nature of the reply, which can be a result or an error, or no reply at all.
An Argument parameter defines the argument of the invoked operation. The argument parameter consists of two functions named AsnToCDRArg and CDRToAsnArg. The functions have pointers to methods of some utility which carries out BER-CDR conversions.
A Result parameter defines the result of the invoked operation. This parameter consists of two functions named AsnTOCDRResult and CDRToAsnResult. The functions have pointers to methods that carry on BER-CDR conversions. Only when a result is expected is there a need for conversion.
A Type parameter contains values INVOKE, RESULT, and ERROR. It identifies whether a record of the Operation Map Table contains information about an "invoke", "result", or "error" operation. In the case of a synchronous call, the Operation Map Table is used to "invoke" and "result" conversions, and the Error Map Table is used for "error" conversion. In case of an asynchronous call, the Operation Map Table is also used for error conversion.

The Error Map Table contains the following parameters:
An ID parameter, which maps an error to the invoked operation.
An Error name parameter declaring the name of the error.
An Error value parameter, which is the argument of the error and consists of two functions with pointers to methods for BER-CDR conversions.

The Extension Map Table contains the following parameters:
An ID parameter, which maps an extension to the invoked operation,
An Extension name parameter, which declares the name of the extension,
A Typecode information, and
An Extension value parameter, which consists of two functions with pointers to methods for BER-CDR conversions.

Whenever an SS7Begin (or SLEBegin) arrives, the ROP Handler calls the Message Set Discriminator to determine the message set.

The Message Set Discriminator discriminates among message sets by comparing the attribute values of SS7Begin (or SLEBegin) to the parameter values of the MSD list (Message Set Discriminator list).

The SS7Begin (or SLEBegin) contains the following attributes:
The EventType describes the type of the primitive.
The DialogId is used to uniquely identify dialogs.
The DestinationAddress describes the destination address of the particular dialog which address consists of the following six fields:
"Length" is the length of the address.
"AddressIndication" indicates the type of the address information contained.
"PointCodeH" is the second octet of the Signaling Point Code.
"PointCodeL" is the first octet of the Signaling Point Code.
"SSN" is the Sub-System Number.
"GlobalTitle" is an identifier.
The OriginatingAddress describes the originating address of the particular dialog and consists of the previous six fields.
The ComponentPresent is set to TRUE if components are present along with the dialog; otherwise it is set to FALSE.
The QualityOfService can be INAP operation class 0 or INAP operation class 1.
The IsPDU is set to TRUE if the dialog PDU is present along with the dialog, otherwise it is set to FALSE.
The PDULenght discloses the Length of the dialog PDU.
The PDU is a pointer towards the dialog PDU.
Thus, the dialog PDU is optional; it may or may not be included in the SS7Begin (or SLEBegin) message.
The AddressIndication indicates the type of address information.

The AddressIndication field is set as one of the following types:
'PC' when the PointCodeH and PointCodeL fields indicate the address.
'PC and SSN' when the PointCodeH and PointCodeL fields and the Sub-System Number field indicate the address.
'GT' when the GlobalTitle indicates the address.
'GT and SSN' when the GlobalTitle field and the Sub-System Number field indicate the address.

The MSD list consists of records, wherein each record contains the following parameters:
Message Set Version Name,
Originating Point Code,
Originating Sub-System Number,
Originating Global Title,
Destination Point Code,
Destination Sub-System Number,
Destination Global Title,
User Information,
Pointer to Application Context Names,
Repository ID,
Pointer to Operation Map Table,
Pointer to Error Map Table,
Pointer to Extension Map Table.

The parameters listed above from the parameter "Message Set Version Name" down to the parameter "User Information" are read in the LDAP directory. The LDAP directory is read when initializing the IWU.

The rest of the parameters listed above are obtained from certain initialization files. There is an initialization file for each message set. These files are used when the IWU is being set up.

Figure 6B:
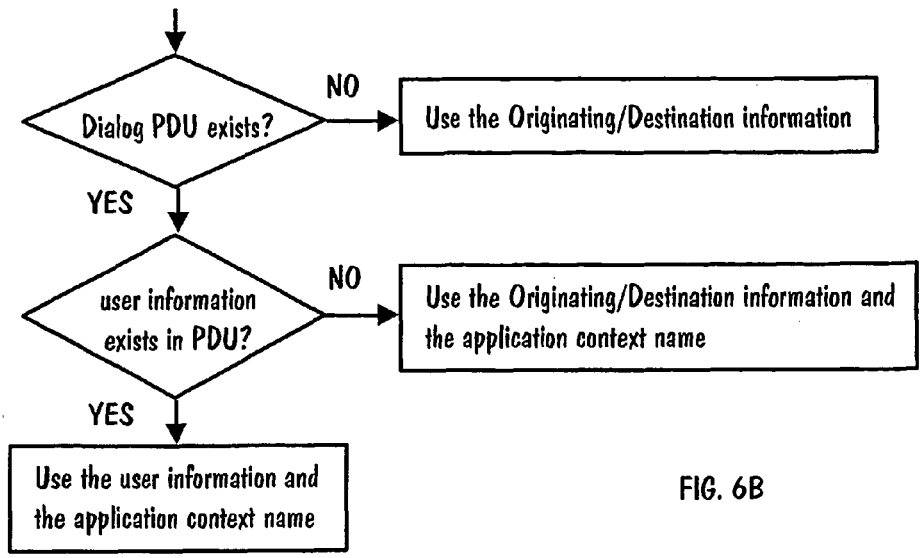
FIG. 6B depicts how MSD list records are compared to the SS7Begin (or SLEBegin) event.
Figure 6C:
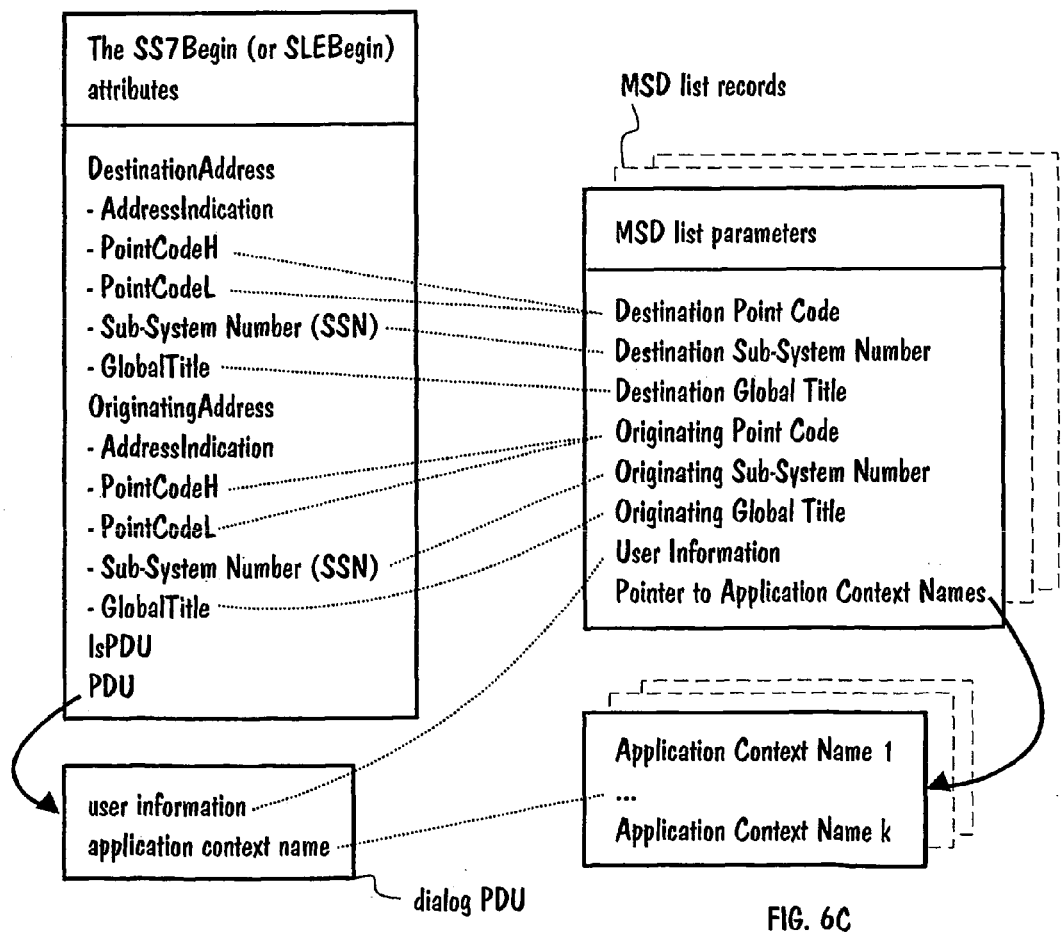
FIG. 6C depicts attributes of the SS7Begin (or SLEBegin) event and corresponding parameters of the MSD list records.

FIG. 6C shows the SS7Begin (or SLEBegin) attributes, the dialog PDU, the MSD list parameters, and the application context names 1, ..., k. FIG. 6C also illustrates three MSD list records; the MSD may contain more than three records, however.

Thus, the message set discrimination is based on the comparison of certain attribute values of the SS7Begin (or SLEBegin) with certain parameter values of the MSD list records.

The matching message set is determined by using one of the following alternatives when comparing the values:
1. the user information and the application context name,
2. the Originating/Destination information and the application context name, and
3. the Originating/Destination information with certain parameter values of the MSD list records.

The first alternative is preferred, and then the second alternative. If the first and the second alternatives are not available, then the third alternative is used.

FIG. 6B shows that the first alternative is available when the dialog PDU of the SS7Begin (or SLEBegin) exists, and the dialog PDU includes the application name. If the dialog PDU exists but it does not include the application name, then the second alternative is used. If the dialog PDU is missing, the third alternative is used.

When the first alternative is available:
the user information received from the dialog PDU of SS7Begin or SLEBegin is compared to the User Information of the MSD list records, and
the application context name received from the dialog PDU of SS7Begin or SLEBegin is compared to the names which are received by using the Pointer to Application Context Names of the MSD list records.

In FIG. 6C dashed lines illustrate these cases of comparison.

When the second alternative is available, the application context name is compared in a manner described above.

When the second or third alternative is used, the Originating/Destination information received from the SS7Begin (or SLEBegin) is compared to the Originating/Destination information of the MSD list as follows:
If the dialog is initiated by the TCAP, the Originating-Address attribute is compared to the Origination information of the MSD list.
If the dialog is initiated by the SLE, the DestinationAddress attribute is compared to the Destination information of the MSD list.

The comparison of the Originating/Destination information is based on the type which is stored in the Address-Indication field of the SS7Begin (or SLEBegin):
If the type is 'PC', the PointCodeH and PointCodeL fields are compared to the Originating/Destination Point Code.
If the type is 'PC and SSN', the PointCodeH and PointCodeL fields are compared to the Originating/Destination Point Code, and the Sub-System Number is compared to the Originating/Destination Sub-System Number.
If the type is 'GT', the GlobalTitle is compared to the Originating/Destination Global Title.
If the type is 'GT and SSN', the GlobalTitle is compared to the Originating/Destination Global Title, and the Sub-System Number is compared to the Originating/Destination Sub-System Number.

When the attribute values of the SS7Begin (or SLEBegin) and the parameter values of the MSD list record match, the correct MSD list record is found. As described above, each MSD list record contains pointers to the Operation, Error, and Extension Map Tables. As described above, the ROP handler transmits those pointers to the MSS.

The invention claimed is:

1. A method for performing data structure conversions in a communications system, wherein at least one data structure comprises at least two elements located in a predetermined order in the data structure which is defined for communication by a definition language and represented in the communication as bit strings, and wherein a source bit string conforming to a first format is converted into a target bit string conforming to a second format,
characterized in that the method comprises the following steps:
browsing the source bit string,
identifying in the source bit string each data structure element of the data structure without parsing the source bit string,
handling the identified data structure elements in the same order as they are located in the data structure, said handling to include decoding each data structure element from the source bit string and encoding the decoded data structure element directly into the target bit string.

2. A method as defined in claim 1, characterized in that the decoding is performed by a decoding function and the encoding is performed by an encoding function, wherein each function is utilized through a function call and said functions are generated by using coding rules and definitions in accordance with the definition language.

3. A method as defined in claim 2, characterized in that, in addition, a wrapper function is generated by applying the coding rules and the definitions so that the wrapper function includes the function call of the decoding function and the function call of the encoding function.

4. A method as defined in claim 1, wherein the definition language is ASN.1.

5. A method as defined in claim 1, wherein the definition language is IDL.

6. A method as defined in claim 1, wherein the first format is BER.

7. A method as defined in claim 1, wherein the second format is CDR.

8. A method as defined in claim 1, characterized in that the data structure element includes a tag for identifying the data structure element and a value stored in the data structure.

9. A method as defined in claim 8, characterized in that the data structure element further includes length information indicating the length of the value within the data structure element.

10. A method as defined in claim 1, characterized in that the steps are executed by a utility of a utility set, each utility of the utility set being created by using at least two class libraries containing classes and a certain definition file containing definitions.

11. A method as defined in claim 10, characterized in that when creating the utilities of the utility set, one utility at a time, the following steps are executed until the definitions of the definition file are read:
reading a definition from the definition file and writing it into a memory, parsing the written definition, whereby a parsed class name is obtained as a result of the parsing, reading a first class corresponding to the parsed class name from a first class library and writing the first class into the memory, reading a second class corresponding to the parsed class name from a second class library and writing the second class into the memory, generating at least one wrapper class, which is adapted to call at least one method of the first class and at least one method of the second class, wherein said methods handle data of the same context, reading each wrapper class, the first class, and the second class from the memory and writing them into an output file set, and compiling the output file set by using a suitable compiler, which compiling results in a utility of the utility set.

12. A method as defined in claim 11, characterized by the further steps of:

generating an identification record in response to the definition read from the definition file, which identification record includes at least one pointer pointing to a utility and writing the identification record into a second output file.

13. A method as defined in claim 11, characterized in that, in order to enable several simultaneous dialogs composed of dialog primitives, the method includes the further steps of:

generating a mapping rule in response to the definition read, which mapping rule maps a first identifier of a first dialog primitive to a second identifier of a second dialog primitive, wherein the first dialog primitive is used by a first application and the second dialog primitive is used by a second application, writing the mapping rules generated into a third output file.

14. A method as defined in claim 1, characterized by the further steps of:

generating data for a context set record in response to the definition read, which data include attribute values relating to a certain context set, and writing the data into a fourth output file.

15. A method as defined in claim 14, characterized in that in creating the context set records, the method includes the further steps of:

reading the data stored in the fourth output file, generating a context set record which includes at least one pointer pointing to an identification record and stored in the second output file, and writing the context set record into a fifth output file.

16. A method as defined in claim 12, characterized by constructing a selection mechanism from the identification records stored in the second output file, from the mapping rules stored in the third output file, and form the context set records stored in the fifth output file, whereby the communications system includes functions of handling a dialog between a first application and a second application, wherein the first application receives and transmits data of the first format, and wherein the second application receives and transmits data of the second format, and executing data conversions for the dialog primitives by using the utility set through the selection mechanism.

17. A method as defined in claim 16, characterized in that the dialog primitives are located in messages which are used in the communication.

18. A method as defined in claim 16, characterized in that the dialog primitives are located in event records which are used in the communication.

19. A method as defined in claim 16, characterized in that in response to receiving a dialog primitive which is initially from the first application and which starts a dialog between the first application and the cation and which starts a dialog between the first application and the second application;

comparing attribute values of the dialog primitive to attribute values of the context set records which are stored in the fifth output file and hereby, finding a context set record with the best match, wherein certain attribute values are the same as the attribute values of the dialog primitive, obtaining at least one pointer pointing from the context set record to an identification record, and transferring a second dialog primitive, which is intended for the second application, wherein the second dialog primitive notifies that the dialog has started.

20. A method as defined in claim 16, characterized in that when the dialog has started, within the communications system:

receiving a first dialog primitive which is initially from the first application, obtaining a first identifier from the first dialog primitive, obtaining a second identifier from a mapping rule stored in the fifth output file, which mapping rule maps the first identifier and the second identifier; and according to the second identifier, generating a second dialog primitive, which corresponds to the first dialog primitive, and obtaining data of the first format from the first dialog primitive, converting the data of the first format to data of the second format, and storing the data of the second format into the second dialog primitive, and transferring the second dialog primitive which is intended for the second application.

21. A method as defined in claim 20, characterized in that the data of the first format is converted to data of the second format by using a pointer pointing from the context set record to an identification record, using a pointer pointing from the identification record to a method of a utility, and executing the method of the utility.

22. A utility for performing data structure conversions in a communications system, wherein at least one data structure comprises at least two elements located in a predetermined order in the data structure elements located in a predetermined order in the data structure which is defined for communication by a definition language and represented in the communication as bit strings, the utility being adapted to convert a source bit string conforming to a first format into a target bit string conforming to a second format, characterized in that the utility comprises:

means for browsing the source bit string, means for identifying a first data structure element in the source bit string, means for handling identified data structure elements in the same order as they are located in the data structure without parsing the source bit string, said means for the handling being adapted to decode each data structure element from the source bit string and encode the decoded data structure element directly into the target bit string.

23. A utility as defined in claim 22, characterized in that said means for handling the identified data structure elements include a decoding function and an encoding function, wherein each function is utilized through a function call and said functions are generated by applying coding rules and definitions in accordance with the definition language.

24. A utility as defined in claim 22, characterized in that, in addition, the utility is adapted to generate a wrapper function by applying the coding rules and the definitions so that the wrapper function includes the function call of the decoding function and the function call of the encoding function.

25. A utility as defined in claim 22, wherein the definition language is ASN.1.

26. A utility as defined in claim 22, wherein the definition language is IDL.

27. A utility as defined in claim 22, wherein the first format is BER.

28. A utility as defined in claim 22, wherein the first format is CDR.

29. A utility as defined in claim 22, characterized in that the first data structure element includes a tag for identifying the first data structure element and a value stored in the first data structure.

30. A utility as defined in claim 22, characterized in that the first data structure element further includes length information indicating the length of the value.

31. A compiler for creating utilities for a utility set by using at least two class libraries containing classes and a certain definition file containing definitions, the utilities being adapted to perform data structure conversions in a communications system, wherein at least one data structure comprises at least two elements located in a predetermined order in the data structure, which is defined for communication by a definition language and represented in the communication as bit strings,
characterized in that the compiler comprises:
means for reading a definition from the definition file and writing it into a memory,
means for parsing the writing definition, whereby a parsed class name is obtained as a result of the parsing,
means for reading a first class corresponding to the parsed class name from the first class library and writing the first class into the memory,
means for reading a second class corresponding to the parsed class name from the second class library and writing the second class into the memory,
means for generating at least one wrapper class, which is adapted to call at least one method of the first class and at least one method of the second class, wherein said methods handle data of the same context,
means for reading each wrapper class, the first class, and the second class from the memory and writing them into an output file set, whereby the output file set results in a utility which is adapted to
browse a source bit string,
identify data structure elements in the source bit string, and
handle identified data structure elements in the same order as they are located in the data structure without parsing the source bit string, and during the handling, decode each data structure element from the source bit string and encode the decoded data structure element directly into the target bit string.

32. A compiler as defined in claim 31, characterized in that the compiler further comprises:
means for generating an identification record in response to the definition read, which identification record includes at least one pointer pointing to a utility, and
means for storing the identification record.

33. A compiler as defined in claim 31, characterized in that in order to enable several simultaneous dialogs to be composed of dialog primitives, the compiler further comprises:
means for generating a mapping rule in response to the definition read, which mapping rule maps a first identifier of a first dialog primitive to a second identifier of a second dialog primitive, wherein the first dialog primitive is used by a first application and the second dialog primitive is used by a second application, and
means for storing the mapping rule.

34. A compiler as defined in claim 31, characterized in that the compiler further comprises:
means for generating data for a context set in response to the definition read, which data include attribute values related to a certain context set, and
means for writing the data into a fourth output file from which the data is be the read by an initialization process and generated to context set records, wherein each context set record includes at least one pointer pointing to an identification record.

35. A system for performing data structure conversions in a communications system, wherein at least one data structure comprises at least two elements located in a predetermined order in the data structure which is defined for communication by a definition language and represented in the communication as bit strings, the system being adapted to handle several simultaneous dialogs composed of dialog primitives,
characterized in that the system comprises:
a utility set for executing the data structure conversions, the utility set being composed of utilities, each utility being adapted to identify data structure elements in a source bit string and handle the identified data structure elements in the same order as they are located in the data structure without parsing the source bit string, and during the handling, decode each data structure element from the source bit string and encode the decoded data structure element directly into a target bit string.

36. A system as defined in claim 35, characterized in that the system further comprises:
a selection mechanism for selecting a utility from the utility set, the selection mechanism being composed of identification records, mapping rules and context set records, wherein each identification record includes at least one pointer pointing to a utility and each mapping rule maps a first identifier of a first dialog primitive and a second identifier of a second dialog primitive, wherein the first dialog primitive is intended for transmitting data of a first format, and the second dialog primitive is intended for transmitting data of a second format, and wherein each context set record includes at least one pointer pointing to an identification record.

37. A system as defined in claim 36, characterized in that the system further comprises:
means for handling a dialog-between a first application and a second application, wherein the first application receives and transmits data of the first format and the second application receives and transmits data of the second format, the means being adapted to perform the data structure conversions for the dialog primitives by using the utility set through the selection mechanism.

38. A system as defined in claim 37, characterized in that the dialog primitives are located in messages which are used in the communication.

39. A system as defined in claim 37, characterized in that the dialog primitives are located in event records which are used in the communication.

40. A system as defined in claim 37, characterized in that the system further comprises:
   means for comparing attribute values of the dialog primitive to attribute values of the context set records, and said means being adapted to find a context set record with the best match, wherein certain attribute values are the same as the attribute values of the dialog primitive, and to obtain at least one pointer pointing from the context set record to an identification record, and
   means for transferring a second dialog primitive which is intended for the second application, wherein the second dialog primitive notifies that the dialog has started.

41. A system as defined in claim 37, characterized in that the system further comprises:
   means for receiving a first dialog primitive which is initially from the first application,
   means for obtaining a first identifier from the first dialog primitive and obtaining a second identifier from a mapping rule stored in the fifth output file, which mapping rule maps the first identifier and the second identifier,
   means for obtaining data of the first format from the first dialog primitive, converting the data of the first format to data of the second format, and storing the data of the second format into the second dialog primitive, and
   means for generating a second dialog primitive, which corresponds to the first dialog primitive, and
   means for transferring the second dialog primitive which is intended for the second application.

42. A method as defined in claim 41, characterized in that the means for obtaining data of the first format, converting the data of the first format to data of the second format, and storing the data of the second format, are adapted to
   use a pointer pointing from the context set record to an identification record,
   use a pointer pointing from the identification record to a method of a utility, and
   execute the method of said utility.

* * * * *